US008643341B2

(12) United States Patent
Hamaguchi et al.

(10) Patent No.: US 8,643,341 B2
(45) Date of Patent: Feb. 4, 2014

(54) BATTERY SYSTEM AND AUTOMOBILE

(75) Inventors: Hiroshi Hamaguchi, Toyota (JP);
Masanori Watanabe, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/207,495

(22) Filed: Aug. 11, 2011

(65) Prior Publication Data
US 2011/0291622 A1 Dec. 1, 2011

Related U.S. Application Data

(63) Continuation of application No. PCT/JP2009/053167, filed on Feb. 23, 2009.

(51) Int. Cl.
*H02J 7/04* (2006.01)
(52) U.S. Cl.
USPC .......................... 320/150; 320/104; 320/134
(58) Field of Classification Search
USPC ........... 320/104, 134, 150, 155; 903/903, 907
See application file for complete search history.

(56) References Cited

U.S. PATENT DOCUMENTS 5,490,572 A * 2/1996 Tajiri et al. ................... 180/65.1
5,708,351 A  1/1998 Takamoro
2005/0253561 A1 * 11/2005 Tibbs ............................ 320/150
2006/0068272 A1 * 3/2006 Takami et al. .................. 429/62
2008/0206628 A1  8/2008 Honbou

FOREIGN PATENT DOCUMENTS

| JP | 9-63652 | 3/1997 |
|---|---|---|
| JP | 2001-52760 | 2/2001 |
| JP | 2006-156024 | 6/2006 |
| JP | 2007-87731 | 4/2007 |
| JP | 2008-210729 | 9/2008 |
| JP | 2009-9888 | 1/2009 |
| JP | 2009-176602 | 8/2009 |
| JP | 2010-198759 | 9/2010 |

OTHER PUBLICATIONS

International Search Report in International Application No. PCT/JP2009/053167; Mailing Date: Mar. 31, 2009.

* cited by examiner

*Primary Examiner* — Edward Tso
*Assistant Examiner* — Aaron Piggush
(74) *Attorney, Agent, or Firm* — Finnegan, Henderson, Farabow, Garrett & Dunner, LLP

(57) ABSTRACT

Disclosed is a battery system wherein safety of a lithium secondary battery can be enhanced by efficiently deactivating (inactivating) lithium metal deposited on a negative electrode of the lithium secondary battery. Also disclosed is an automobile. Specifically disclosed is a battery system comprising a lithium ion secondary battery and a temperature control unit for controlling the temperature of the lithium ion secondary battery. The temperature control unit performs such a control that the temperature T of the lithium ion secondary battery is maintained within the following range: 55° C.<T<65° C., for a predetermined time.

5 Claims, 14 Drawing Sheets

BATTERY SYSTEM AND AUTOMOBILE

CROSS-REFERENCE TO RELATED APPLICATIONS

This application is a continuation application based upon and claims the benefit of the prior PCT International Patent Application No. PCT/JP2009/053167 filed on Feb. 23, 2009, the entire contents of which are incorporated herein by reference.

TECHNICAL FIELD

The present invention relates to a battery system equipped with a lithium ion secondary battery, and to an automobile equipped with such a battery system.

BACKGROUND ART

Much attention is being paid to lithium ion secondary batteries serving as a power supply for use in portable equipment or serving as a power supply for use in electric automobiles, hybrid electric automobiles and other like vehicles. Incidentally, in a lithium ion secondary battery, the performing of charging (in particular, the performing of high-rate charging), for example, under a low temperature environment may result in the deposition or precipitation of lithium on the surface of a negative electrode. Most of the lithium deposited on the negative electrode surface will make no contribution to the battery charging and discharging reaction, so that if such charging is repeatedly carried out, the problem arises that the battery capacity will decrease. In recent years, various methods have been proposed with a view to providing solutions to the aforesaid problem (see, for example, Patent Document 1).
Patent Document 1: JP 2001-52760A Patent Document 1 proposes a charging method in which there is set a charging voltage in response to the battery temperature at the time of starting charging, and at the charging voltage thus set, constant voltage charging is carried out. More specifically, the lower the battery temperature at the time of starting charging, the lower the charging voltage is set. This, according to the description, makes it possible to prevent, at the time of charging under a low temperature environment, the negative electrode from decreasing in electric potential due to the decrease in battery temperature and, as a result, the electric potential of the negative electrode is impeded from decreasing to the lithium deposition electric potential, thereby preventing the deposition of lithium.

DISCLOSURE OF THE INVENTION

Problems to be Solved by the Invention

Incidentally, the metallic lithium deposited on the negative electrode is high in activity. Therefore, if such a state of the metallic lithium being deposited on the negative electrode is left neglected, this will reduce the safety of the lithium ion secondary battery. Consequently, there have recently been demands for techniques capable of enhancing the safety of lithium ion secondary batteries by deactivating or inactivating the metallic lithium deposited on the negative electrode. However, the technique according to Patent Document 1 is incapable of enhancing the safety of lithium ion secondary batteries by deactivating or inactivating the metallic lithium deposited on the negative electrode.

The present invention has been made in view of the circumstances and has a purpose to provide a battery system and an automobile capable of enhancing the safety of a lithium ion secondary battery by efficient deactivation or inactivation of the metallic lithium deposited on the negative electrode of the lithium ion secondary battery.

Means of Solving the Problems

To achieve the above purpose, one aspect of the invention provides a battery system comprising: a lithium ion secondary battery; and a temperature control device for controlling the temperature of the lithium ion secondary battery, wherein the lithium ion secondary battery is adapted to be mounted in an automobile as a drive power supply of the automobile, the temperature control device performs control to maintain the temperature T of the lithium ion secondary battery within the range: 55° C.<T<65° C. for a predetermined length of time and stops the control when the predetermined length of time elapses to deactivate metallic lithium deposited on a negative electrode of the lithium ion secondary battery.

In the above-described battery system, the temperature control device conducts control to maintain the temperature T of the lithium ion secondary battery mounted in the automobile as the drive power supply of the automobile within the range: 55° C.<T<65° C., for a predetermined length of time. If the temperature T of the lithium ion secondary battery is maintained at a higher temperature than 55° C. for a predetermined length of time, the metallic lithium deposited on the negative electrode of the lithium ion secondary battery can efficiently be deactivated or inactivated. By such deactivation or inactivation of the metallic lithium of high activity, it becomes possible to enhance the safety of the battery.

In addition, the non-aqueous electrolyte of the lithium ion secondary battery has a tendency to advance in decomposition reaction once the storage temperature increases to above 65° C. On the other hand, in the above-described battery system, the temperature control device performs control to maintain the temperature T of the lithium ion secondary battery within the range: 55° C.<T<65° C. This makes it possible to achieve efficient deactivation or inactivation of the metallic lithium deposited on the negative electrode of the lithium ion secondary battery while restraining the non-aqueous electrolyte from decomposition.

In the aforesaid battery system, preferably, the lithium ion secondary battery is adopted to be mounted as an automobile drive power supply in an automobile, the battery system is configured to enable charging of the lithium ion secondary battery by use of electric power supplied from an external power supply during parking of the automobile, and the temperature control device performs control to maintain the temperature T of the lithium ion secondary battery within the range: 55° C.<T<65° during a period of time in which the lithium ion secondary battery is charged with electric power supplied from the external power supply.

Further, another aspect of the invention provides a battery system comprising: a lithium ion secondary battery; and a temperature control device for controlling the temperature of the lithium ion secondary battery, wherein the temperature control device performs control to maintain the temperature T of the lithium ion secondary battery within the range: 55° C.<T<65° C. for a predetermined length of time, wherein the lithium ion secondary battery is adopted to be mounted as an automobile drive power supply in an automobile, the battery system is configured to enable charging of the lithium ion secondary battery by use of electric power supplied from an external power supply during parking of the automobile, and the temperature control device performs control to maintain the temperature T of the lithium ion secondary battery within the range: 55° C.<T<65° during a period of time in which the lithium ion secondary battery is charged with electric power supplied from the external power supply.

The above-described battery system is a battery system which is mounted in an automobile or vehicle (more specifically, a hybrid electric automobile, an electric automobile etc.) to serve as a drive power supply and which is configured so as to enable charging of the lithium ion secondary battery by use of electric power supplied from the external power supply. Automobiles equipped with such a type of battery system have a tendency that their lithium ion secondary battery is charged with electric power supplied from an external power supply at fixed intervals (for example, at intervals of every several days) for a predetermined length of time (for examples, for 8 hours) when being parked (being parked in a motor garage or other like place). Accordingly, the metallic lithium deposited on the negative electrode of the lithium ion secondary battery can periodically be deactivated or inactivated by maintaining the temperature T of the lithium ion secondary battery within the range: 55° C.<T<65° C. during a period of time in which the lithium ion secondary battery is being charged with electric power supplied from the external power supply during parking of the automobile.

Further, if the temperature of the lithium ion secondary battery is controlled during traveling of the automobile, there is a possibility that effects on the automobile's traveling performance. However, according to the above-described battery system, the temperature of the lithium ion secondary battery is controlled during parking of the automobile, thereby eliminating that possibility.

In any one of the aforesaid battery systems, preferably, the temperature control device performs control to maintain the temperature of the lithium ion secondary battery at 60° C. for a predetermined length of time.

By maintaining the temperature of the lithium ion secondary battery at 60° C. for a predetermined length of time, it becomes possible to effectively deactivate or inactivate the metallic lithium deposited on the negative electrode of the lithium ion secondary battery while restraining the non-aqueous electrolyte from decomposition.

In any one of the aforesaid battery systems, further preferably, before performing second temperature control to maintain the temperature T of the lithium ion secondary battery within the range: 55° C.<T<65° C., the temperature control device performs first temperature control to maintain the temperature T of the lithium ion secondary battery within the range: 35° C.≤T≤55° C.

Since much of the lithium deposited on the surface of the negative electrode will make no contribution to the battery charging/discharging reaction, the battery capacity falls with the deposition of lithium on the surface of the negative electrode. As described above, the safety of the battery can be enhanced if the metallic lithium deposited on the negative electrode of the lithium ion secondary battery is deactivated or inactivated. However, the lithium, once deactivated or inactivated, will make no contribution to the battery charging/discharging action. Therefore, as the metallic lithium deposited on the negative electrode becomes deactivated or inactivated, the battery capacity will fall accordingly.

On the other hand, according to the above-described battery system, before the temperature T of the lithium ion secondary battery is maintained within the range: 55° C.<T<65° C. for a predetermined length of time, the temperature T of the lithium ion secondary battery is maintained within the range: 35° C.≤T≤55° C. for a predetermined length of time. The temperature T of the lithium ion secondary battery is first maintained within the range: 35° C.≤T≤55° C. for a predetermined period of time whereby the metallic lithium deposited on the negative electrode of the lithium ion secondary battery is allowed to efficiently return to lithium ions. This enables effective recovery of the battery capacity that has been decreased due to the deposition of lithium. Thereafter, the temperature T of the lithium ion secondary battery is maintained within the range: 55° C.<T<65° C. for a predetermined length of time whereby it becomes possible to deactivate or inactivate the metallic lithium that has failed to return to lithium ions. Therefore, according to the above-described battery system, it becomes possible to enhance the safety of the battery while accomplishing effective recovery of the battery capacity that has been decreased due to the deposition of lithium.

Further, in the aforesaid battery system, preferably, the temperature control device performs the first temperature control to maintain the temperature T of the lithium ion secondary battery at 45° C., and performs the second temperature control to maintain the temperature T of the lithium ion secondary battery at 60° C.

According to the above-described battery system, the temperature control device first provides, as the first temperature control, control so that the temperature T of the lithium ion secondary battery is maintained at 45° C. and then provides, as the second temperature control, control so that the temperature T of the lithium ion secondary battery is maintained at 60° C. Stated in another way, after exerting control that maintains the temperature T of the lithium ion secondary battery at 45° C., the temperature control device then conducts control to maintain the temperature T of the lithium ion secondary battery at 60° C.

In the first place, the temperature T of the lithium ion secondary battery is maintained at 45° C. for a predetermined period of time, which makes it possible that the metallic lithium deposited on the negative electrode of the lithium ion secondary battery is allowed to extremely efficiently return to lithium ions, thereby accomplishing extremely effective recovery of the battery capacity that has been decreased due to the deposition of lithium. Thereafter, the temperature T of the lithium ion secondary battery is maintained at 60° C. for a predetermined length of time, thereby making it possible that the metallic lithium that has failed to return to lithium ions can effectively be deactivated or inactivated. Therefore, according to the above-described battery system, it becomes possible to enhance the safety of the battery to a considerable extent while accomplishing extremely effective recovery of the battery capacity that has been decreased due to the deposition of lithium.

Another aspect of the invention provides an automobile equipped with one of the aforementioned battery systems.

The use of any lithium ion battery as an automobile's drive power supply, with metallic lithium deposited on the negative electrode, is objectionable in view of safety. Incidentally, lithium ion secondary batteries mounted as a drive power supply for automobiles or vehicles (hybrid electric automobiles, electric automobiles and other like vehicles) are subjected to high-rate (great current) charging. Therefore, lithium ions not taken into the negative electrode tend to deposit, in the form of metallic lithium, to the negative electrode by Li-ion diffusion limitation (diffusion controlling). Therefore, the lithium ion secondary battery mounded, as a drive power supply, in the automobile is under such an environment that metallic lithium more tends to deposit on the negative electrode, as compared to the case where lithium ion secondary batteries are used as a power supply for use in other types of electronics devices.

On the other hand, since the above-described automobile is provided with the aforementioned battery system, it is possible to efficiently deactivate or inactivate the metallic lithium deposited on the negative electrode of the lithium ion secondary battery while restraining the non-aqueous electrolyte from decomposition. It is therefore possible to enhance the safety of lithium ion secondary batteries, therefore eventually enhancing the safety of automobiles.

BRIEF DESCRIPTION OF THE DRAWINGS 1, 11, 21, 31: Automobile
6, 16, 26, 36: Battery system
10: Assembled battery
20, 220, 320, 420: Temperature control device
30, 230, 330, 430: Microcomputer (Temperature control device)
46: Commercial power supply (External power supply)
50: Cooling device (Temperature control device)
60: Heating device (Temperature control device)
100: Lithium ion secondary battery

MODE FOR CARRYING OUT THE INVENTION

Example 1

Figure 1:
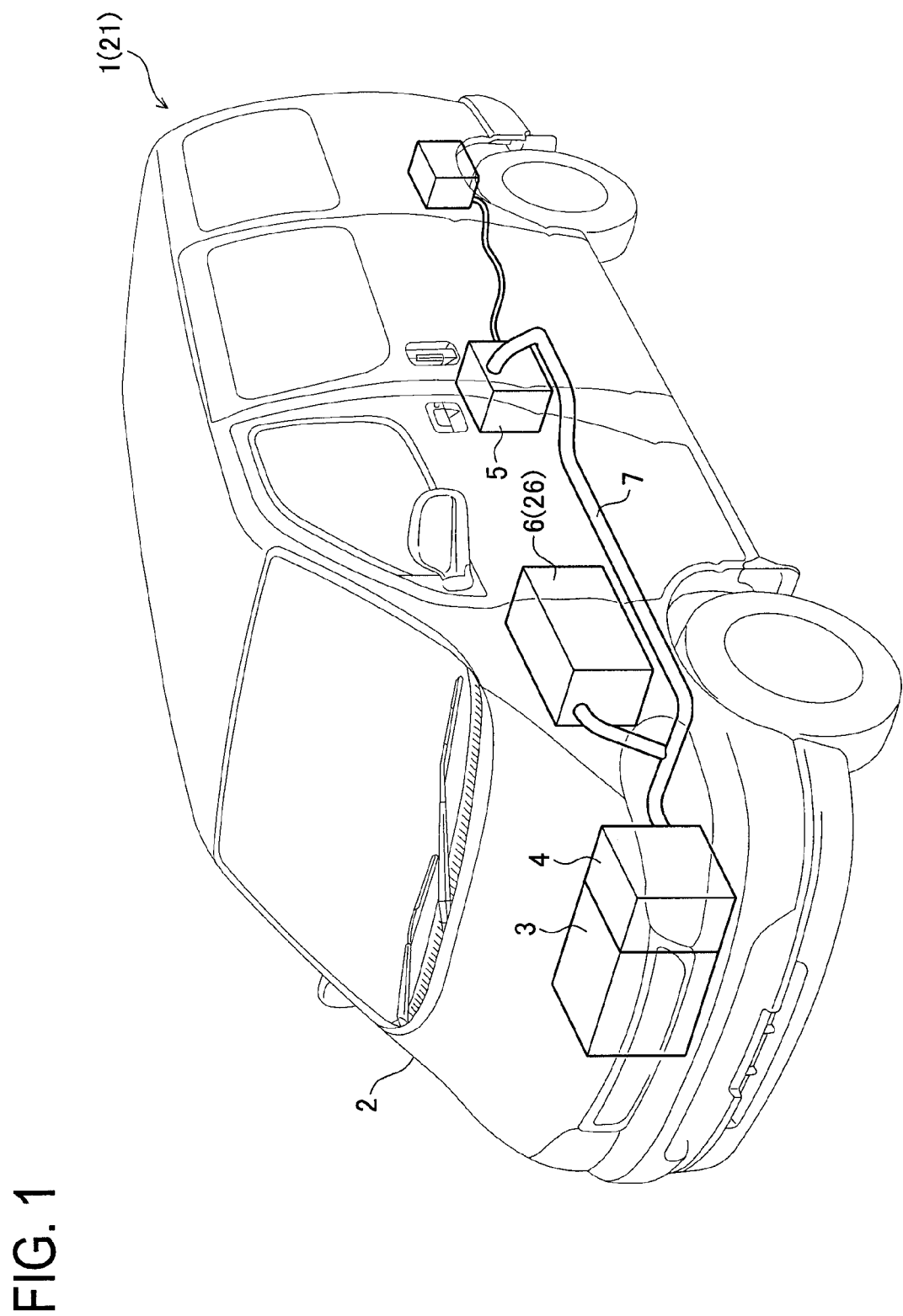
FIG. 1 is a schematic view of an automobile in Examples 1 and 2.

A detailed description of Example 1 embodying the present invention will now be given referring to the accompanying drawings. As shown in FIG. 1, an automobile 1 of Example 1 has a vehicle body 2, an engine 3, a front motor 4, a rear motor 5, a battery system 6 and a cable 7. The automobile 1 is a hybrid electric automobile which is driven by parallel use of the engine 3, the front motor 4 and the rear motor 5. In particular, the automobile 1 is configured such that it is driven by using the engine 3, the front motor 4 and the rear motor 5 by known means, with the battery system 6 (more specifically, an assembled battery 10 of the battery system 6, see FIG. 2) serving as a drive power supply for the front motor 4 and the rear motor 5.

Figure 2:
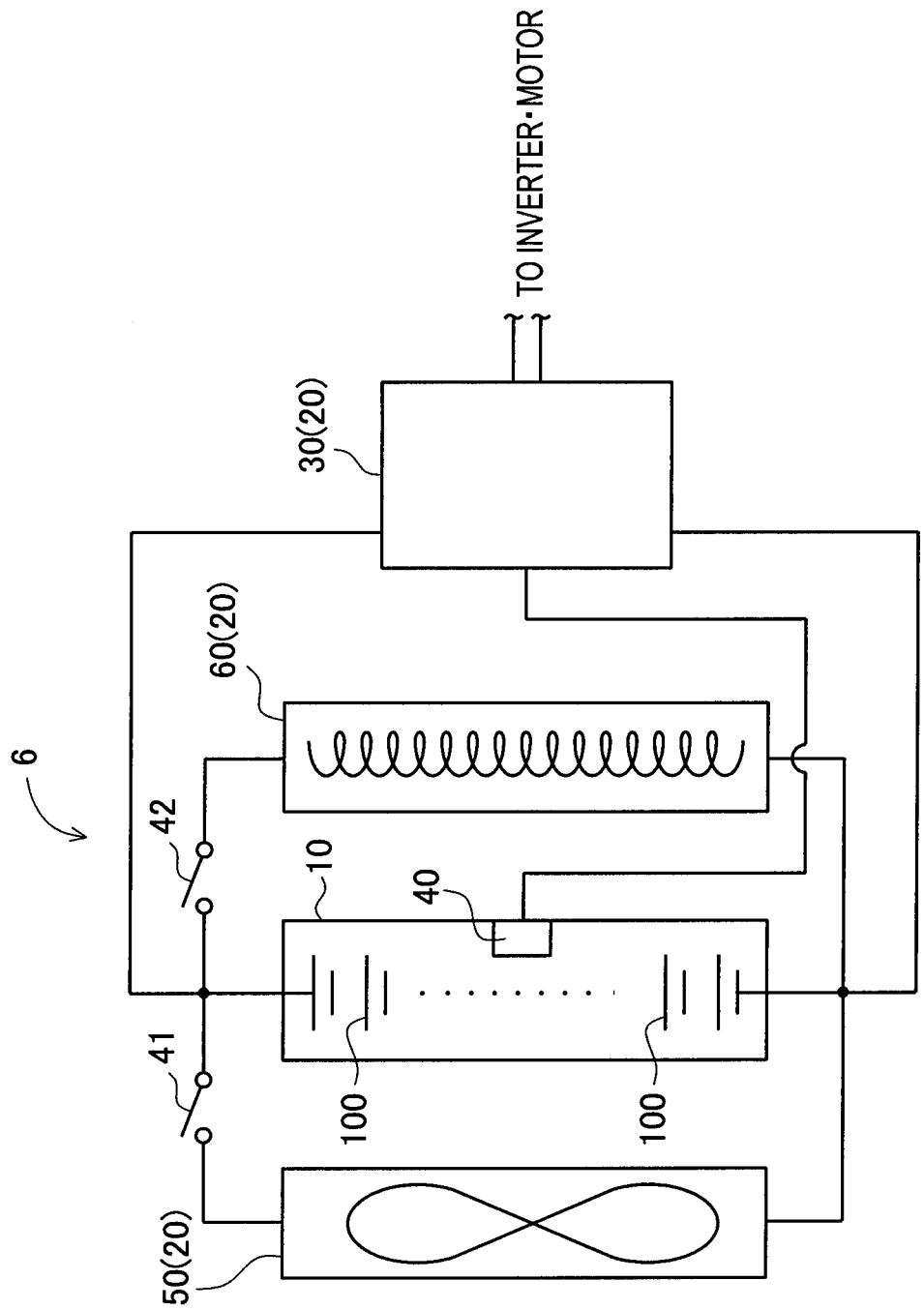
FIG. 2 is a schematic view of a battery system in Example 1.

Of these components, the battery system 6 is mounted to the vehicle body 2 of the automobile 1 and is connected by the cable 7 to the front motor 4 and the rear motor 5. As shown in FIG. 2, the battery system 6 is provided with the assembled battery 10 composed of a plurality of lithium ion secondary batteries 100 (cells) that are electrically connected together in series, and a temperature control device 20. The temperature control device 20 has a microcomputer 30, a cooling device 50 (such as a cooling fan) and a heating device 60 (such as a heater). The microcomputer 30 further has a ROM, a CPU, a RAM etc. which are not shown in the figure.

As shown in FIG. 2, mounted to the assembled battery 10 is a thermistor 40 for detecting the battery temperature T of the lithium ion secondary battery 100. The thermistor 40 is electrically connected to the microcomputer 30. This allows the microcomputer 30 to detect the battery temperature T of the lithium ion secondary battery 100.

In addition, the cooling device 50 is electrically connected, through a switch 41, to the assembled battery 10. By placing the cooling device 50 in operation, the lithium ion secondary battery 100 constituting the assembled battery 10 can be cooled. Further, the heating device 60 is electrically connected, through a switch 42, to the assembled battery 10. By placing the heating device 60 in operation, the lithium ion secondary battery 100 constituting the assembled battery 10 can be heated.

The microcomputer 30 determines whether or not the battery temperature T of the lithium ion secondary battery 100 detected through the thermistor 40 is 60° C. Further, if the microcomputer 30 determines that the battery temperature T of the lithium ion secondary battery 100 is not 60° C., the microcomputer 30 then performs control to either heat or cool the lithium ion secondary battery 100 for the temperature T of the lithium ion secondary battery 100 to reach a temperature of 60° C.

In particular, if the microcomputer 30 determines that the battery temperature T of the lithium ion secondary battery 100 is higher than 60° C., then the microcomputer 30 controls the cooling device 50 to cool the lithium ion secondary battery 100. More specifically, the microcomputer 30 sends electric signals to turn on the switch 41 (see FIG. 2) and turn off the switch 42. This provides the supply of electric power from the assembled battery 10 to the cooling device 50 to thereby activate the cooling device 50 to cool the lithium ion secondary battery 100 constituting the assembled battery 10.

Furthermore, after starting cooling of the lithium ion secondary battery 100, the microcomputer 30 detects the battery temperature T of the lithium ion secondary battery 100. The microcomputer 30 then judges whether or not the battery temperature of the lithium ion secondary battery 100 has reached 60° C. If the judgment is that the battery temperature T of the lithium ion secondary battery 100 has not yet reached 60° C., the lithium ion secondary battery 100 is then continuously cooled by the cooling device 50.

Subsequently, if the microcomputer 30 determines that the battery temperature T of the lithium ion secondary battery 100 has reached 60° C., the microcomputer 30 then performs control to stop cooling of the lithium ion secondary battery 100. More specifically, the microcomputer 30 sends an electric signal to place the switch 41 in the off state. This shuts off the supply of electric power from the assembled battery 10 to the cooling device 50, to thereby stop the cooling device 50 from cooling the lithium ion secondary battery 100.

On the other hand, if the microcomputer 30 determines that the battery temperature T of the lithium ion secondary battery 100 is lower than 60° C., the microcomputer 30 then controls the heating device 60 to heat the lithium ion secondary battery 100. More specifically, the microcomputer 30 sends electric signals to turn on the switch 42 (see FIG. 2) and turn off the switch 41. This provides the supply of electric power from the assembled battery 10 to the heating device 60 to thereby activate the heating device 60, whereby heating the lithium ion secondary battery 100 constituting the assembled battery 10.

Furthermore, after starting heating of the lithium ion secondary battery 100, the microcomputer 30 detects the battery temperature T of the lithium ion secondary battery 100. Then, the microcomputer 30 judges whether or not the battery temperature T of the lithium ion secondary battery 100 has reached 60° C. If the judgment is that the battery temperature T of the lithium ion secondary battery 100 has not yet reached 60° C., the lithium ion secondary battery 100 is then continuously heated by the heating device 60.

Subsequently, if the microcomputer 30 determines that the battery temperature T of the lithium ion secondary battery 100 has reached 60° C., the microcomputer 30 then stops heating of the lithium ion secondary battery 100. More specifically, the microcomputer 30 sends an electric signal to place the switch 42 in the off state. This shuts off the supply of electric power from the assembled battery 10 to the heating device 60, to thereby stop the heating device 60 from heating the lithium ion secondary battery 100. In the way as described above, in Example 1, the battery temperature T of the lithium ion secondary battery 100 is maintained within the range: 55° C.<T<65° C. (more specifically, maintained at 60° C.) by the temperature control device 20.

Figure 3:
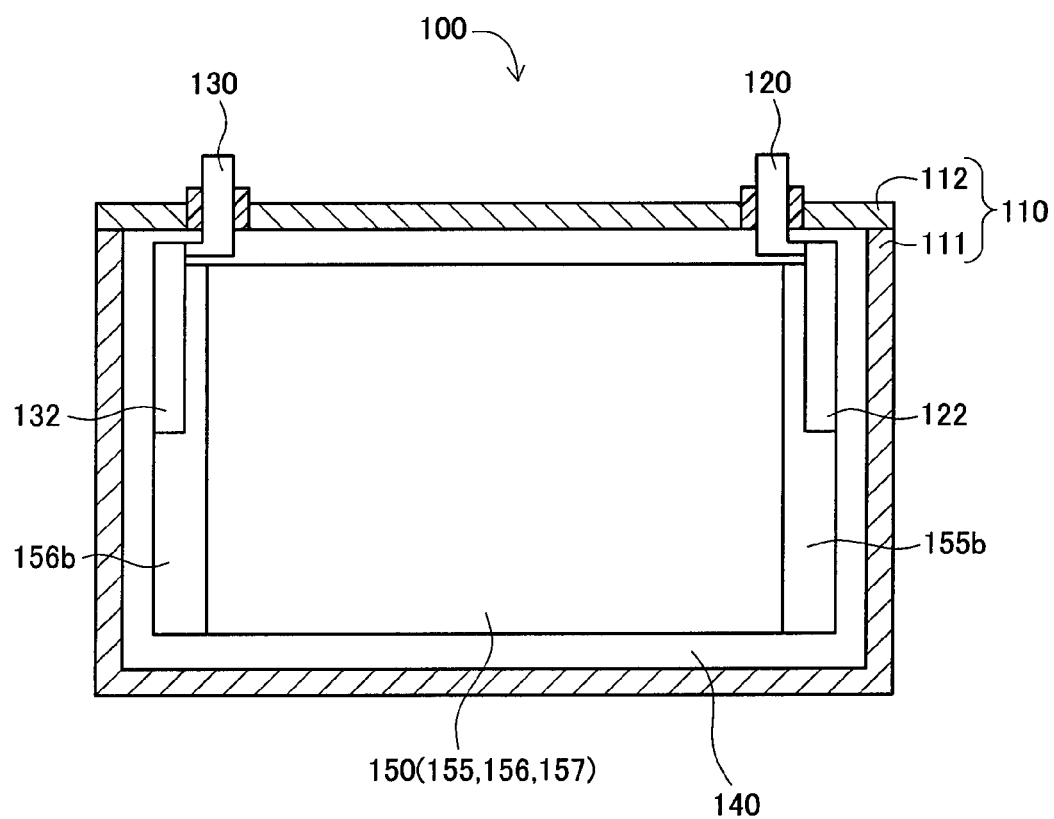
FIG. 3 is a cross-sectional view of a lithium ion secondary battery.

As shown in FIG. 3, the lithium ion secondary battery 100 is a lithium ion secondary battery of the sealed type having a battery casing 110 having a rectangular parallelepiped shape, a positive terminal 120 and a negative terminal 130. Of these components, the battery casing 110 is formed of metal and has a rectangular housing part 111 defining a rectangular parallelepiped housing space and a metallic covering part 112. Housed in the battery casing 110 (the rectangular housing part 111) are an electrode body 150, a non-aqueous electrolyte 140 and so on.

Figure 4:
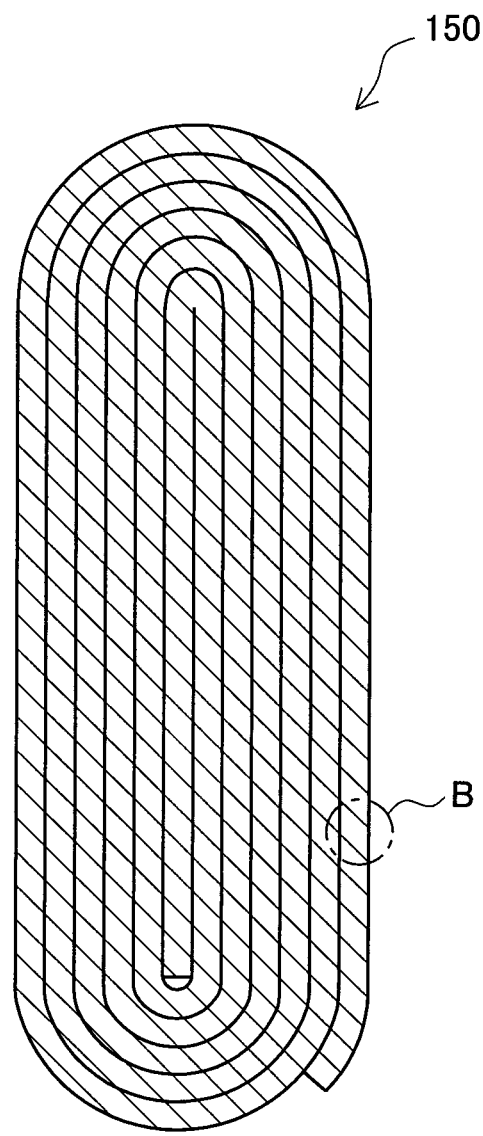
FIG. 4 is a cross-sectional view of an electrode body of the lithium ion secondary battery.
Figure 5:
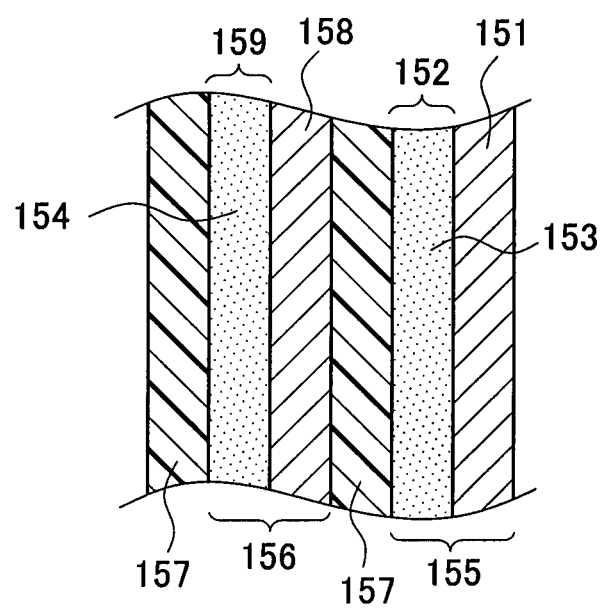
FIG. 5 is a partially enlarged cross-sectional view of the electrode body, corresponding to an enlarged view of Section B of FIG. 4.

As shown in FIGS. 4 and 5, the electrode body 150 has a long circle or elliptic shape in cross section and is a flattened, wound body formed by winding a positive electrode plate 155, a negative electrode plate 156 and a separator 157, which are all in the form of a sheet. The electrode body 150 has a positive wound section 155*b* and a negative wound section 156*b*. The positive wound section 155*b* is located at one of the ends of the electrode body 150 in an axial direction thereof (i.e., a horizontal right-hand end relative to FIG. 3) and is vorticosely overlapped with only a part of the positive electrode plate 155. The negative wound section 156*b* is located at the other end of the electrode body 150 in the axial direction (i.e., a horizontal left-hand end relative to FIG. 3) and is vorticosely overlapped with only a part of the negative electrode plate 156. The positive electrode plate 155 excluding the positive wound section 155*b* is coated with a positive material mixture 152 which contains a positive active material 153 (see FIG. 5). Likewise, the negative electrode plate 156 excluding the negative wound section 156*b* is coated with a negative material mixture 159 which contains a negative active material 154 (see FIG. 5). The positive wound section 155*b* is electrically connected through a positive current collector 122 to the positive terminal 120. The negative wound section 156*b* is electrically connected through a negative current collector 132 to the negative terminal 130.

In the lithium ion secondary battery 100, lithium nickelate (lithium nickel oxide) is used as the positive active material 153. In addition, natural graphite is used as the negative active material 154. Additionally, as the non-aqueous electrolyte 140, there is used a non-aqueous electrolyte prepared by dissolving lithium hexafluorophosphate (LiPF6) into a non-aqueous solvent which is a mixture of EC (ethylene carbonate), DMC (dimethyl carbonate) and EMC (ethyl methyl carbonate).

Next, five lithium ion secondary batteries 100 (referred to as Samples 1-5 respectively) were prepared, and cyclic testing was conducted on each sample under a respective different condition. More specifically, under a temperature environment (0° C.), Sample 2 was subjected to charging at a current value of 20 C for 10 seconds and then subjected to discharging at a current value of 20 C for 10 seconds. This cyclic charging/discharging was taken as one cycle, and 10 cycles of the cyclic charging/discharging were executed. Subsequently, Sample 2 was stored in a constant temperature bath of −15° C. for 16 hours. And, 80 cycles of such "cyclic charging/discharging-constant temperature storage", one cycle of which comprises 10-cycle cyclic charging/discharging and −15° C. constant temperature storage, were executed. In other words, Sample 2 was subjected to a total of 800 cycles of the cyclic charging/discharging performed by providing −15° C. constant temperature storage for 16 hours every after 10 cycles of the cyclic charging/discharging. In addition, 1 C is an electric current value capable of causing the state of charge (SOC) of the lithium ion secondary battery 100 to change to 0% from 100% in one hour when subjected to constant current discharging.

In addition, Sample 3 was subjected to 10 cycles of the cyclic charging/discharging and then stored in a constant temperature bath of 25° C. for 16 hours. And, 80 cycles of such "cyclic charging/discharging-constant temperature storage", one cycle of which comprises 10-cycle cyclic charging/discharging and 25° C. constant temperature storage, were executed. In other words, Sample 3 was subjected to a total of 800 cycles of the cyclic charging/discharging performed by providing 25° C. constant temperature storage for 16 hours every after 10 cycles of the cyclic charging/discharging.

Further, Sample 4 was subjected to 10 cycles of the cyclic charging/discharging and then stored in a constant temperature bath of 45° C. for 16 hours. And, 80 cycles of such "cyclic charging/discharging-constant temperature storage", one cycle of which comprises 10-cycle cyclic charging/discharging and 45° C. constant temperature storage, were executed. In other words, Sample 4 was subjected to a total of 800 cycles of the cyclic charging/discharging performed by providing 45° C. constant temperature storage for 16 hours every after 10 cycles of the cyclic charging/discharging.

Sample 5 was subjected to 10 cycles of the cyclic charging/discharging and then stored in a constant temperature bath of 60° C. for 16 hours. And, 80 cycles of such "cyclic charging/discharging-constant temperature storage", one cycle of which comprises 10-cycle cyclic charging/discharging and 60° C. constant temperature storage, were executed. Stated in another way, Sample 5 was subjected to a total of 800 cycles of the cyclic charging/discharging performed by providing 60° C. constant temperature storage for 16 hours every after 10 cycles of the cyclic charging/discharging.

Sample 1 was subjected to 10 cycles of the cyclic charging/discharging and then continuously subjected to the cyclic charging/discharging without any storage in a constant temperature bath, unlike the other samples. In the way as described above, 800 cycles of the cyclic charging/discharging in total were executed.

After the above-described cyclic testing on Samples 1-5, these samples were disassembled for removal of their respective negative electrode plates 156. Subsequently, with respect to each sample, the amount of deposition or precipitation of lithium on its respective negative electrode plate 156 was measured by means of inductively-coupled plasma emission spectrometry. More specifically, a part of the negative electrode plate 156 was cut off and the piece cut off was dissolved in a royal water and then diluted with water to thereby prepare a sample liquid. Subsequently, with the aid of an inductively-coupled plasma emission spectrometer (ICPS-8100, Shimadzu Corporation), the amount of lithium in each sample liquid (i.e., the weight of lithium deposited on the part of the negative electrode plate 156) was measured. Based on the measurement result, the deposition amount of lithium on the entire negative electrode plate 156 was calculated.

Furthermore, with respect to each sample, the ratio of active metallic lithium and deactivated (inactivated) lithium in the lithium deposited on the negative electrode plate 156 was measured using a solid-state Li-NMR method. More specifically, a part of the negative electrode plate 156 was cut off and the piece cut off was inserted in a measurement tube in an NMR device (DSX 400, a solid-state nuclear magnetic resonance device, BRUKER) for NMR analysis. As a result of this, the ratio of active metallic lithium and deactivated (inactivated) lithium for each sample was acquired. In addition, as a deactivated (inactivated) lithium, there are given lithiums that change to compounds, such as LiF, $Li_2CO_3$ etc., by reaction with the non-aqueous electrolyte 140.

Figure 6:
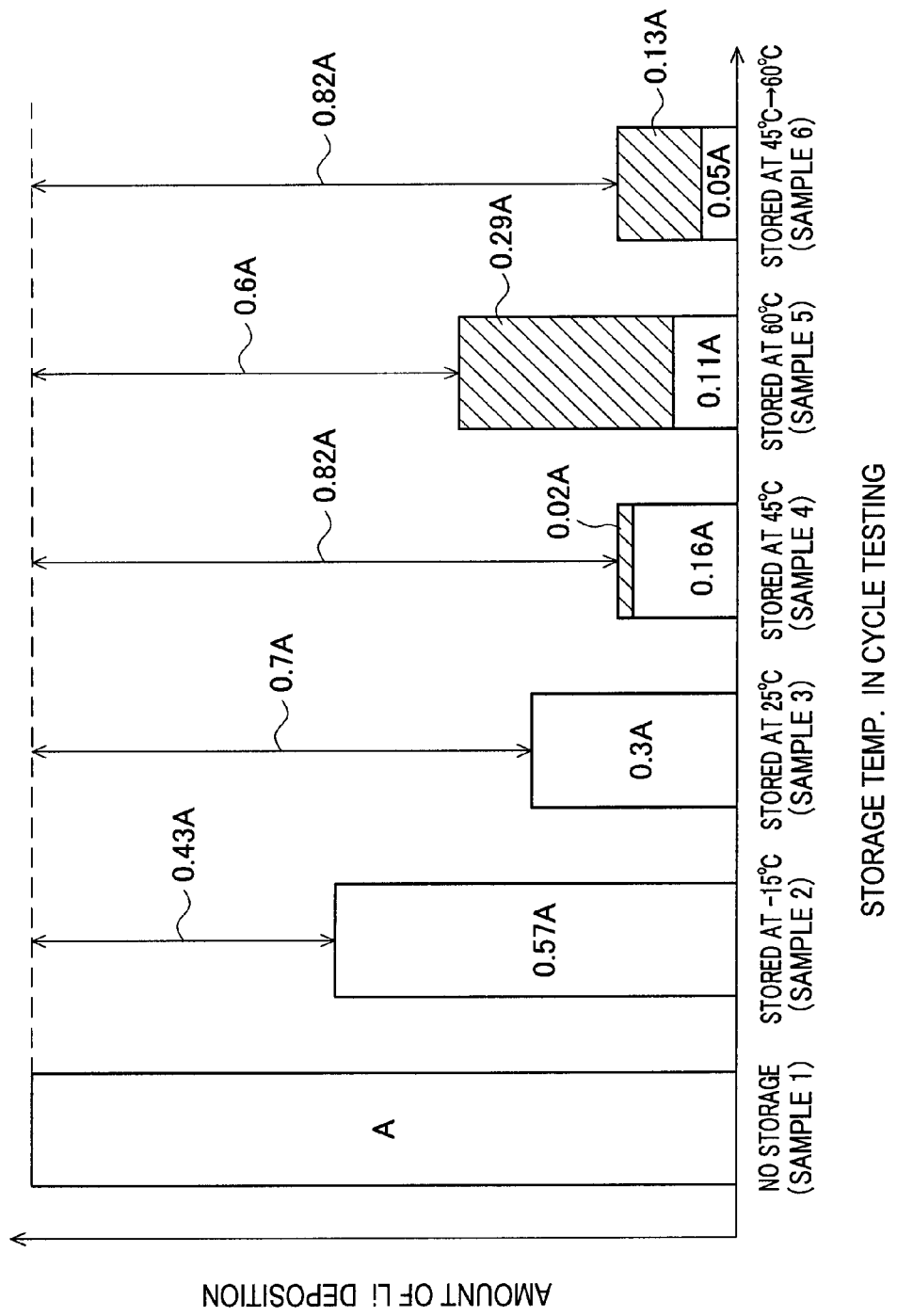
FIG. 6 is a bar graph representative of the amounts of deposition of lithium after each cyclic testing at a respective different storage temperature.

These results are shown in FIG. 6. In FIG. 6, the deposition amount of lithium in each sample (the sum of active metallic lithium and deactivated lithium) is represented, on the basis of Sample 1 serving as a reference (A), by the length of bar in the bar graph. Furthermore, in the bar representing each sample, the blank white portion indicates the amount of active metallic lithium whereas the hatched portion indicates the amount of deactivated (inactivated) lithium.

As shown in FIG. 6, in Sample 1, all of the deposition amount of lithium on the negative electrode plate 156 was active metallic lithium. That is, in Sample 1, the deposition amount of active metallic lithium was A.

In Sample 2, the deposition amount of lithium on the negative electrode plate 156 was 0.57A and all thereof was active metallic lithium. That is, in Sample 2, the deposition amount of active metallic lithium was 0.57A.

In Sample 3, the deposition amount of lithium on the negative electrode plate 156 was 0.3A and all thereof was active metallic lithium. That is, in Sample 3, the deposition amount of active metallic lithium was 0.3A.

In sample 4, the deposition amount of lithium on the negative electrode plate 156 was 0.18A. 0.16A of this deposited amount was active metallic lithium and 0.02A thereof was deactivated (inactivated) lithium. As just described, in Sample 4, a part of the metallic lithium deposited on the negative electrode plate 156 was deactivated or inactivated to thereby reduce the deposition amount of active metallic lithium down to 0.16A.

In Sample 5, the deposition amount of lithium on the negative electrode plate 156 was 0.4A. 0.11A of this deposited amount was active metallic lithium and 0.29A thereof was deactivated (inactivated) lithium. As just described, in Sample 5, much of the metallic lithium deposited on the negative electrode plate 156 was deactivated or inactivated to thereby reduce the deposition amount of active metallic lithium down to 0.11A.

From the above results, it can be said that the setting of the storage temperature of the lithium ion secondary battery 100 at 60° C. makes it possible to effectively deactivate or inactivate the metallic lithium deposited on the negative electrode plate 156. Besides, from the tendency of variation in the amount of deactivated lithium (represented by hatching in FIG. 6), it can be said that by increasing the storage temperature to higher than 55° C., it becomes possible to accomplish efficient deactivation or inactivation of the metallic lithium deposited on the negative electrode plate 156.

Therefore, if the temperature T of the lithium ion secondary battery 100 is maintained at higher temperatures than 55° C. for a predetermined period of time, it is possible to efficiently deactivate or inactivate the metallic lithium deposited on the negative electrode plate 156 of the lithium ion secondary battery 100. Such deactivation or inactivation of the metallic lithium of high activity makes it possible to enhance the safety of the lithium ion secondary battery 100.

In addition, the non-aqueous electrolyte 140 of the lithium ion secondary battery 100 advances in decomposition reaction once the storage temperature increases to above 65° C. Accordingly, in order to restrain the non-aqueous electrolyte 140 from undergoing decomposition, it is preferable that the storage temperature of the lithium ion secondary battery 100 is lower than 65° C.

From the above, it can be said that the maintaining of the temperature T of the lithium ion secondary battery 100 within the range: 55° C.<T<65° C. can efficiently deactivate or inactivate the metallic lithium deposited on the negative electrode plate 156 of the lithium ion secondary battery 100, to thereby reduce the deposition amount of metallic lithium to a considerable extent while restraining the non-aqueous electrolyte 140 from decomposition. In particular, it can be said that if the temperature T of the lithium ion secondary battery 100 is maintained at 60° C. for a predetermined length of time, this makes it possible to effectively deactivate or inactivate the metallic lithium deposited on the negative electrode plate 156, to thereby effectively reduce the deposition amount of metallic lithium while restraining the non-aqueous electrolyte 140 from decomposition.

Figure 7:
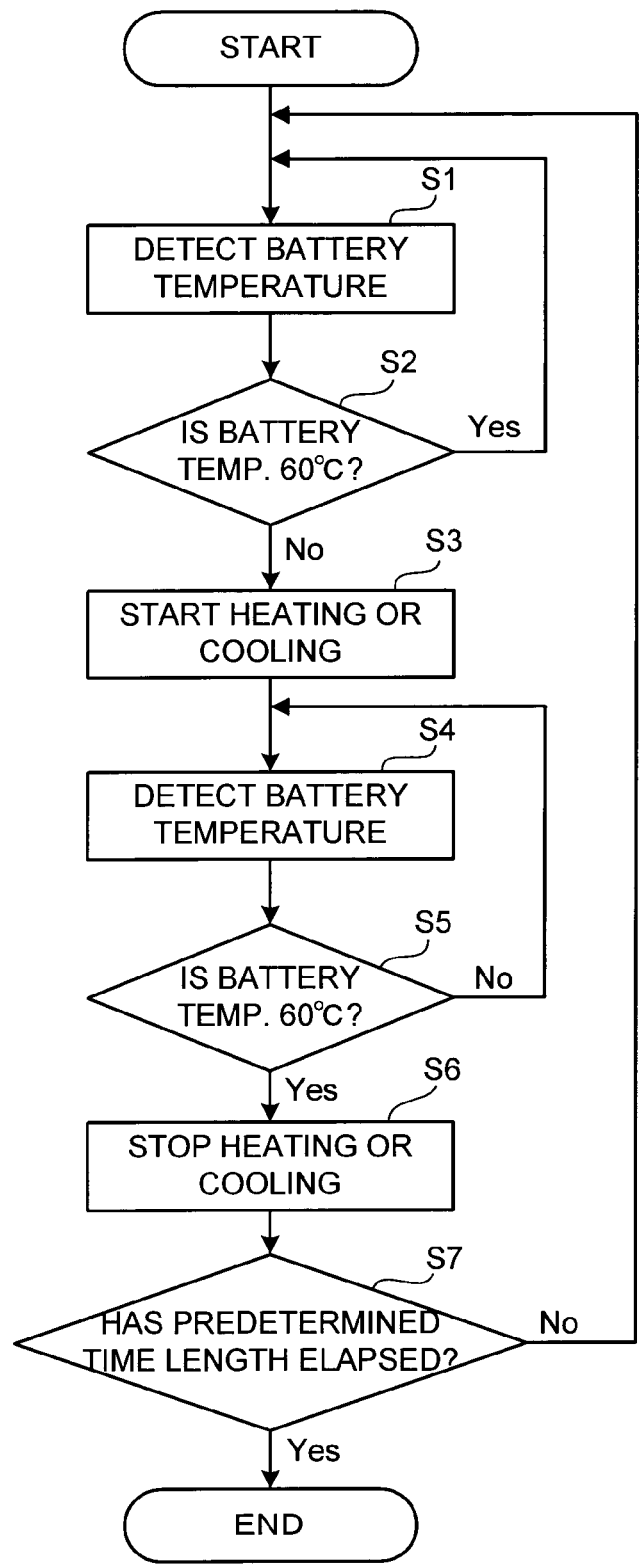
FIG. 7 is a flowchart representative of a temperature control flow of the lithium ion secondary battery in Example 1.

Next, by making reference to FIG. 7, a description will be given regarding the temperature control of the lithium ion secondary battery 100 in the automobile 1 of Example 1. In Step S1, the microcomputer 30 first detects, based on the output signal from the thermistor 40 (see FIG. 2), the temperature T of the lithium ion secondary battery 100. Next, the temperature control program advances to Step S2 where it is determined whether or not the detected battery temperature T of the lithium ion secondary battery 100 is 60° C.

If Step S2 determines that the battery temperature T of the lithium ion secondary battery 100 is 60° C. (YES), the procedure returns again to Step S1, and the above-described process operation is carried out. On the other hand, if Step S2 determines that the battery temperature T of the lithium ion secondary battery 100 is not 60° C. (NO), the program advances to Step S3 where the cooling or heating of the lithium ion secondary battery 100 constituting the assembled battery 10 is started.

In particular, if the microcomputer 30 determines that the battery temperature T of the lithium ion secondary battery 100 is higher than 60° C., the microcomputer 30 then controls the cooling device 50 to cool the lithium ion secondary battery 100. More specifically, the microcomputer 30 sends electric signals to turn on the switch 41 (see FIG. 2) and turn off the switch 42. This provides the supply of electric power from the assembled battery 10 to the cooling device 50 to thereby place the cooling device 50 in operation, whereby cooling the lithium ion secondary battery 100 constituting the assembled battery 10.

On the contrary, if the microcomputer 30 determines that the battery temperature T of the lithium ion secondary battery 100 is lower than 60° C., the microcomputer 30 then controls the heating device 60 to heat the lithium ion secondary battery 100. More specifically, the microcomputer 30 sends electric signals to turn on the switch 42 (see FIG. 2) and turn off the switch 41. This provides the supply of electric power from the assembled battery 10 to the heating device 60 to thereby place the heating device 60 in operation to heat the lithium ion secondary battery 100 constituting the assembled battery 10.

Next, the program advances to Step S4 where the temperature T of the lithium ion secondary battery 100 is detected. Subsequently, the program advances to Step S5 where it is determined whether or not the detected battery temperature T of the lithium ion secondary battery 100 reaches 60° C.

If Step S5 determines that the battery temperature T of the lithium ion secondary battery 100 has not yet reached 60° C. (NO), the program then returns again to Step S4 where the temperature T of the lithium ion secondary battery 100 is detected. Thereafter, if Step S5 determines that the battery temperature T of the lithium ion secondary battery 100 has reached 60° C. (YES), the program then advances to Step S6 where either the cooling or the heating of the lithium ion secondary battery 100 (the assembled battery 10) is brought to a stop.

More specifically, when the lithium ion secondary battery 100 is being cooled, the microcomputer 30 sends an electric signal to place the switch 41 in the off state. This shuts off the supply of electric power from the assembled battery 10 to the cooling device 50, to thereby stop the cooling device 50 from cooling the lithium ion secondary battery 100.

On the contrary, when the lithium ion secondary battery 100 is being heated, the microcomputer 30 sends an electric signal to place the switch 42 in the off state. This shuts off the supply of electric power from the assembled battery 10 to the heating device 60, to thereby stop the heating device 60 from heating the lithium ion secondary battery 100.

Subsequently, the program advances to Step S7 where the microcomputer 30 determines whether or not a predetermined length of time (for example, 8 hours) elapses since when the temperature T of the lithium ion secondary battery 100 was initially determined to be 60° C. If it is determined that the predetermined length of time has not yet elapsed (NO), the program then returns again to Step S1, and the above-described process operation is carried out. On the other hand, if it is determined that the predetermined length of time has elapsed (YES), the series of process operations is then stopped.

In the way as described above, according to Example 1, the temperature T of the lithium ion secondary battery 100 can be maintained within the range: 55° C.<T<65° C. (in particular, at 60° C.) for a predetermined length of time (for example, for 8 hours). It is therefore possible to efficiently deactivate or inactivate the metallic lithium deposited on the negative electrode plate 156 of the lithium ion secondary battery 100 while restraining the non-aqueous electrolyte 140 from decomposition, to thereby reduce the deposition amount of metallic lithium to a considerable extent. This makes it possible to enhance the safety of the lithium ion secondary battery 100, therefore eventually enhancing the safety of the automobile 1.

It is preferable that the process operations of Steps S1-S7 as described above (i.e., the temperature control of the lithium ion secondary battery 100) are carried out at predetermined intervals (for example, at intervals of every several days). Additionally, it may be arranged as follows. The deposition amount of lithium on the negative electrode plate 156 of the lithium ion secondary battery 100 is estimated. If the estimated amount reaches a specified value, then the process operations of Steps S1-S7 (i.e., the temperature control of the lithium ion secondary battery 100) are carried out.

Example 2

Figure 8:
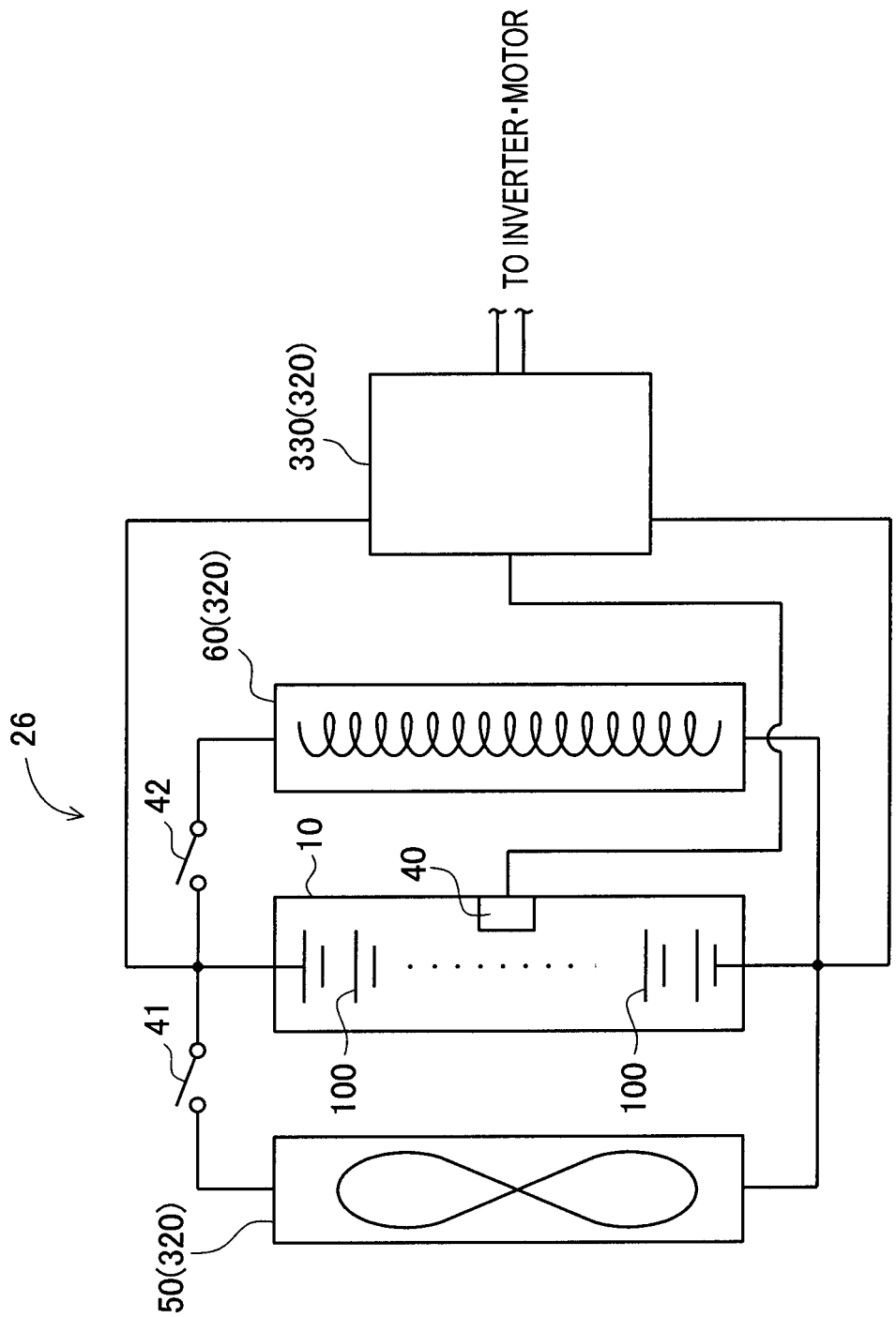
FIG. 8 is a schematic view of a battery system in Example 2.

Next, a description will be given regarding Example 2 of the present invention referring to the drawings. A hybrid electric automobile 21 of Example 2 is shown in FIG. 1. This hybrid electric automobile 21 differs from the hybrid electric automobile 1 of Example 1 only in a battery system. As shown in FIG. 8, a battery system 26 of Example 2 is provided with an assembled battery 10 which is of the same type as that of Example 1 and a temperature control device 320 which is different from that of Example 1. The temperature control device 320 has a cooling device 50 and a heating device 60, both of which are of the same type as those of Example 1, and a microcomputer 330 which is different from that of Example 1. The microcomputer 330 has a ROM, a CPU, a RAM etc. which are not shown in the figure.

The microcomputer 330 first judges whether or not the battery temperature T of the lithium ion secondary battery 100 detected through the thermistor 40 is 45° C. And, if the microcomputer 330 judges that the battery temperature T of the lithium ion secondary battery 100 is not 45° C., the microcomputer 330 then performs control to either heat or cool the lithium ion secondary battery 100 for the temperature T of the lithium ion secondary battery 100 to reaches 45° C.

More specifically, if the microcomputer 330 determines that the battery temperature of the lithium ion secondary battery 100 is higher than 45° C., the microcomputer 330 then controls the cooling device 50 to cool the lithium ion secondary battery 100. Particularly, the microcomputer 330 sends electric signals to turn on the switch 41 (see FIG. 8) and turn off the switch 42. This provides the supply of electric power from the assembled battery 10 to the cooling device 50 to thereby activate the cooling device 50, whereby cooling the lithium ion secondary battery 100 constituting the assembled battery 10.

Furthermore, after starting cooling of the lithium ion secondary battery 100, the microcomputer 330 detects the battery temperature of the lithium ion secondary battery 100. Then, it is determined whether or not the battery temperature of the lithium ion secondary battery 100 has reached 45° C. If the determination is that the battery temperature of the lithium ion secondary battery 100 has not yet reached 45° C., then the lithium ion secondary battery 100 is continuously cooled by the cooling device 50.

Subsequently, if the microcomputer 330 determines that the battery temperature of the lithium ion secondary battery 100 has reached 45° C., the microcomputer 330 then stops cooling of the lithium ion secondary battery 100. More specifically, the microcomputer 330 sends an electric signal to place the switch 41 in the off state. This shuts off the supply of electric power from the assembled battery 10 to the cooling device 50, to thereby stop the cooling device 50 from cooling the lithium ion secondary battery 100.

On the other hand, if the microcomputer 330 determines that the battery temperature of the lithium ion secondary battery 100 is lower than 45° C., the microcomputer 330 then controls the heating device 60 to heat the lithium ion secondary battery 100. Particularly, the microcomputer 330 sends electric signals to turn on the switch 42 (see FIG. 8) and turn off the switch 41. This provides the supply of electric power from the assembled battery 10 to the heating device 60 to thereby place the heating device 60 in operation, whereby the lithium ion secondary battery 100 constituting the assembled battery 10 is heated.

Furthermore, after starting heating of the lithium ion secondary battery 100, the microcomputer 330 detects the battery temperature of the lithium ion secondary battery 100. Then, it is determined whether or not the battery temperature of the lithium ion secondary battery 100 has reached 45° C. If the determination is that the battery temperature of the lithium ion secondary battery 100 has not yet reached 45° C., then the lithium ion secondary battery 100 is continuously heated by the heating device 60.

Subsequently, if the microcomputer 330 determines that the battery temperature of the lithium ion secondary battery 100 has reached 45° C., the microcomputer 330 then stops heating of the lithium ion secondary battery 100. More specifically, there is sent an electric signal to place the switch 42 in the off state. This shuts off the supply of electric power from the assembled battery 10 to the heating device 60, to thereby stop the heating device 60 from heating the lithium ion secondary battery 100.

In the way as described above, in Example 2, the battery temperature of the lithium ion secondary battery 100 is maintained, by the temperature control device 320, within the range of not lower than 35° C. nor higher than 55° C. (particularly, maintained at 45° C.) for a first predetermined length of time (for example, for 4 hours). This makes it possible for the metallic lithium deposited on the negative electrode plate 156 of the lithium ion secondary battery 100 to efficiently return back to lithium ions. This enables effective recovery of the battery capacity that has been decreased due to the deposition of lithium.

Thereafter, the microcomputer 330 of Example 2 determines whether or not the battery temperature T of the lithium ion secondary battery 100 detected through the thermistor 40 is 60° C. And, if the microcomputer 330 determines that the battery temperature T of the lithium ion secondary battery 100 is not 60° C., the microcomputer 330 then performs control to either heat or cool the lithium ion secondary battery 100 for the temperature T of the lithium ion secondary battery 100 to reach 60° C.

In the way as described above, Example 2 enables that after the battery temperature of the lithium ion secondary battery 100 is first maintained within the range of not lower than 35° C. nor higher than 55° C. (particularly, maintained at 45° C.) for a first predetermined length of time (for example, for 4 hours) (the first temperature control), the battery temperature T of the lithium ion secondary battery 100 is then maintained, by the temperature control device 320, within the range: 55° C.<T<65° C. (particularly, maintained at 60° C.) for a second predetermined length of time (for example, for 4 hours) (the second temperature control). This makes it possible to efficiently deactivate or inactivate the metallic lithium that has failed to return to lithium ions by the first temperature control for the first predetermined length of time.

Therefore, according to the battery system 26 of Example 2, while the battery capacity of the lithium ion secondary battery 100 that has been decreased due to the deposition of lithium is effectively recovered, the safety of the lithium ion secondary battery 100 is enhanced.

Next, there was prepared a lithium ion secondary battery 100 (referred to as Sample 6), and Sample 6 was subjected to the cyclic testing. This cyclic testing differed only in storage conditions for sample storage in the constant temperature bath from the cyclic testing conducted on Samples 2-5 described above, and the other conditions were the same.

More specifically, Sample 6 was first subjected to the same cyclic charging/discharging (10 cycles) that Samples 2-5 were subjected to. This was followed by storage of Sample 6 in a constant temperature bath of 45° C. for 8 hours and subsequently, Sample 6 was stored in a constant temperature bath of 60° C. for 8 hours. And, 80 cycles of such "cyclic charging/discharging-constant temperature storage", one cycle of which comprises 10-cycle cyclic charging/discharging and 45° C./60° C. constant temperature storage, were executed. Stated in another way, Sample 6 was subjected to a total 800 cycles of the cyclic charging/discharging performed by providing the first constant temperature storage (at 45° C.) for 8 hours and the second constant temperature storage (at 60° C.) for 8 hours every after 10 cycles of the cyclic charging/discharging.

After the above-described cyclic testing was conducted on Sample 6, the deposition amount of lithium on the negative electrode plate 156 of Sample 6 was measured by means of inductively-coupled plasma emission spectrometry in the same way as done with Samples 1-5. Furthermore, with respect to Sample 6, the ratio of active metallic lithium and deactivated (inactivated) lithium in the lithium deposited on the negative electrode plate 156 was measured using a solid-state Li-NMR method in the same way as done with Samples 1-5. This result was shown in FIG. 6.

As described above, it can be said that the maintaining of the temperature T of the lithium ion secondary battery 100 within the range: 55° C.<T<65° C. (in particular, at 60° C.) for a predetermined length of time makes it possible to efficiently deactivate or inactivate the metallic lithium deposited on the negative electrode plate 156 of the lithium ion secondary battery 100, thereby reducing the deposition amount of metallic lithium to a considerable extent while restraining the non-aqueous electrolyte 140 from decomposition. It is therefore possible to enhance the safety of the lithium ion secondary battery 100.

Incidentally, for the case of lithium ion secondary batteries, their battery capacity will decrease in response to the deposition amount of lithium. Especially, the lithium, once deactivated or inactivated, will make no contribution to the charging/discharging action of the battery. More specifically, for the case of Sample 5 whose storage temperature was set at 60° C., the metallic lithium deposited on the negative electrode plate 156 was most effectively deactivated to thereby minimize the deposition amount of metallic lithium, as shown in FIG. 6. However, the lithium deposition amount (the sum of metallic lithium and deactivated lithium) was 0.4A which is greater than that of Sample 4 (0.18A).

Comparison in the deposition amount of lithium between Sample 1 and Sample 4 shows that the deposition amount of lithium in Sample 4 is reduced by 82% relative to Sample 1. In other words, for Sample 4, 82% of the battery capacity that has been decreased due to the cyclic charging/discharging was recovered. On the other hand, for Sample 5, the deposition amount of lithium was reduced by only 60%. In other words, for Sample 5, only 60% of the battery capacity that has been decreased due to the cyclic charging/discharging was recovered. From this result, it can be said that although Sample 5 excels at diminishing the deposition amount of metallic lithium by effective deactivation of metallic lithium as compared to Sample 4, but is at a disadvantage in terms of the recovery of battery capacity.

Therefore, it can be said that in order to achieve effective recovery of the battery capacity that has been decreased due to the deposition of lithium, it is most preferable that the storage temperature is set at 45° C. In addition, from the pattern of variation in the lithium deposition amount (in other words, the pattern of recovery of the battery capacity) as shown in FIG. 6, it can be said that the battery capacity is recovered more when the storage temperature is set at 35° C. than when the storage temperature is set at 25° C. (70% recovery). Furthermore, it can be said that the battery capacity is recovered more when the storage temperature is set at 55° C. than when the storage temperature is set at 60° C. (60% recovery). Thus, it can be said that if the storage temperature is set to fall within the range of not lower than 35° C. nor higher than 55° C., this accomplishes effective recovery of the battery capacity that has been decreased due to the deposition of lithium.

From the above, it can be said that if the temperature of the lithium ion secondary battery 100 is maintained within the range of not lower than 35° C. nor higher than 55° C. for a predetermined length of time, this will accomplish effective recovery of the battery capacity that has been decreased due to the deposition of lithium. Particularly, it can be said that if the temperature of the lithium ion secondary battery 100 is maintained at 45° C. for a predetermined length of time, this will accomplish extremely effective recovery of the battery capacity that has been decreased due to the deposition of lithium.

Here, the result of Sample 6 is examined. As shown in FIG. 6, the deposition amount of lithium in Sample 6 was 0.18A. Accordingly, the deposition amount of lithium in Sample 6 was reduced by 82% relative to Sample 1. In other words, 82% of the battery capacity that has been decreased due to the cyclic charging/discharging was recovered in Sample 6. In the way as described above, in Sample 6, the battery capacity that has been decreased due to the deposition of lithium was effectively recovered, as in Sample 4. This is because after subjected to the cyclic charging/discharging (10 cycles), Sample 6 was first stored in the constant temperature bath at a temperature within the range of not lower than 35° C. nor higher than 55° C. (more specifically, at 45° C.).

Furthermore, in Sample 6, 00.5A of the lithium deposited on the negative electrode plate 156 was active metallic lithium whereas 0.13A thereof was deactivated or inactivated lithium. As just described, in Sample 6, much of the metallic lithium deposited on the negative electrode plate 156 was deactivated or inactivated, to thereby reduce the deposition amount of active metallic lithium down to 0.05A (the least among all the samples). This is because after subjected to storage in the constant temperature bath at a temperature within the range of not lower than 35° C. nor higher than 55° C. (more specifically, at 45° C.), the battery temperature T of Sample 6 was maintained within the range: 55° C.<T<65° C. (more specifically, at 60° C.). This could be thought to accomplish efficient deactivation or inactivation of the metallic lithium that has failed to return to lithium ions by storage at 45° C.

From the above results, it can be said that by maintaining the battery temperature of the lithium ion secondary battery 100 within the range of not lower than 35° C. nor higher than 55° C. (particularly, at 45° C.) for a predetermined length of time, and thereafter by maintaining the battery temperature T of the lithium ion secondary battery 100 within the range: 55° C.<T<65° C. (particularly, at 60° C.) for a predetermined length of time, the battery capacity of the lithium ion secondary battery 100 that has been decreased due to the deposition of lithium is effectively recovered and, in addition, the safety of the lithium ion secondary battery 100 is enhanced while restraining the non-aqueous electrolyte 140 from decomposition.

Figure 9:
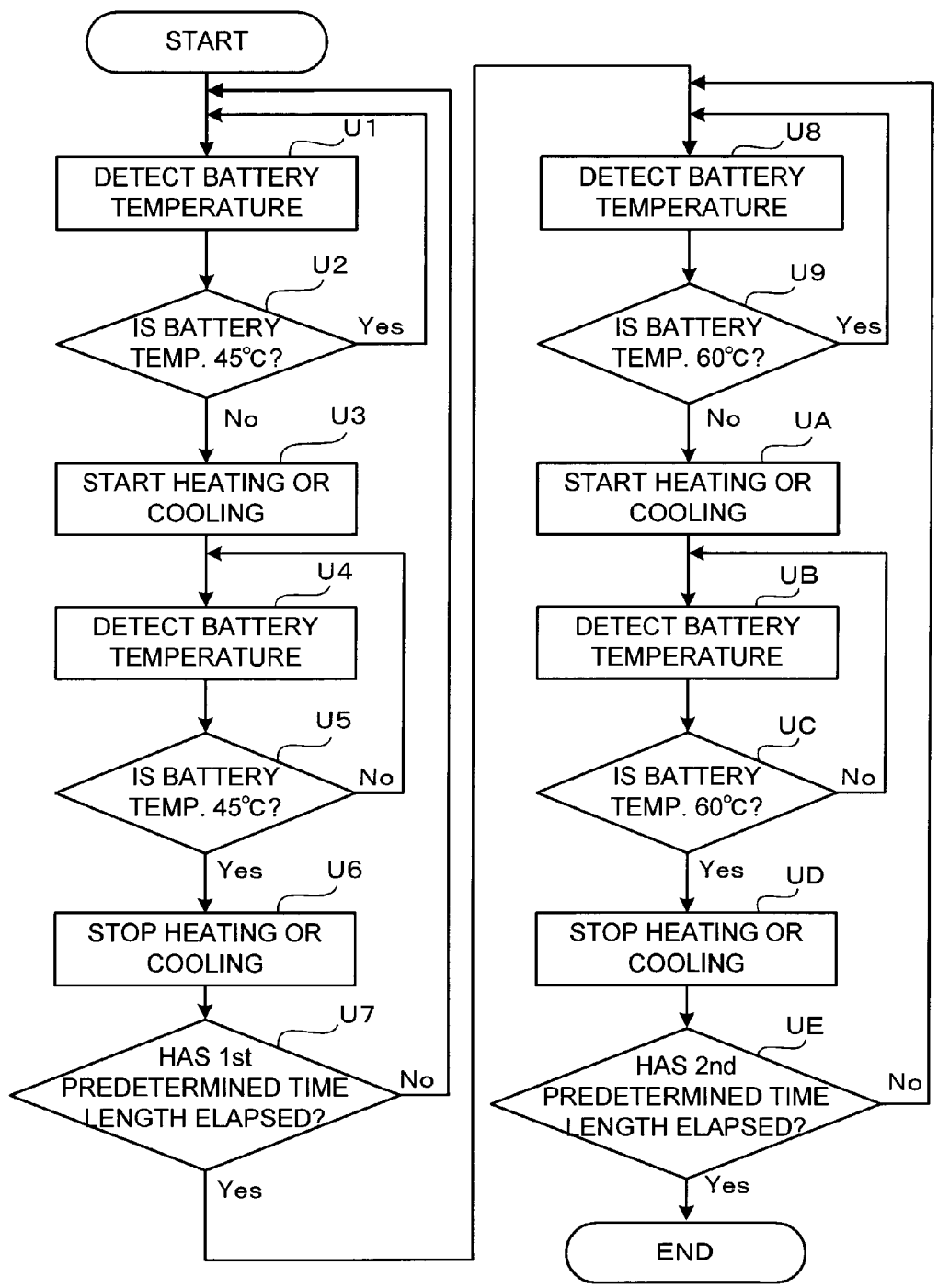
FIG. 9 is a flowchart representative of a temperature control flow of the lithium ion secondary battery in Example 2.

Next, referring to FIG. 9, a description will be given regarding the temperature control of the lithium ion secondary battery 100 in the automobile 21 of Example 2. In Step U1, the microcomputer 330 first detects, based on the output signal from the thermistor 40 (see FIG. 8), the temperature T of the lithium ion secondary battery 100. Next, the temperature control program advances to Step U2 where it is determined whether or not the detected battery temperature T of the lithium ion secondary battery 100 is 45° C.

If Step U2 determines that the battery temperature T of the lithium ion secondary battery 100 is 45° C. (YES), the program then returns again to Step U1, and the above-described process operation is carried out. On the other hand, if Step U2 determines that the battery temperature T of the lithium ion secondary battery 100 is not 45° C. (NO), the program then advances to Step U3, and either the cooling or the heating of the lithium ion secondary battery 100 constituting the assembled battery 10 is started.

More specifically, if the microcomputer 330 determines that the battery temperature T of the lithium ion secondary battery 100 is higher than 45° C., the microcomputer 330 then controls the cooling device 50 to cool the lithium ion secondary battery 100. Particularly, the microcomputer 330 sends electric signals to turn on the switch 41 (see FIG. 8) and turn off the switch 42. This provides the supply of electric power from the assembled battery 10 to the cooling device 50, to thereby place the cooling device 50 in operation to cool the lithium ion secondary battery 100 constituting the assembled battery 10.

On the contrary, if the microcomputer 330 determines that the battery temperature T of the lithium ion secondary battery 100 is lower than 45° C., the microcomputer 330 then controls the heating device 60 to heat the lithium ion secondary battery 100. Particularly, the microcomputer 330 sends electric signals to turn on the switch 42 (see FIG. 8) and turn off the switch 41. This provides the supply of electric power from the assembled battery 10 to the heating device 60, to thereby place the heating device 60 in operation to heat the lithium ion secondary battery 100 constituting the assembled battery 10.

Next, the program advances to Step U4 where the temperature T of the lithium ion secondary battery 100 is detected. Thereafter, the program advances to Step U5 where it is determined whether or not the detected battery temperature T of the lithium ion secondary battery 100 reaches 45° C.

If Step U5 determines that the battery temperature T of the lithium ion secondary battery 100 has not yet reached 45° C., the program then returns again to Step U4, and the temperature T of the lithium ion secondary battery 100 is detected. Thereafter, if Step U5 determines that the battery temperature T of the lithium ion secondary battery 100 has reached 45° C. (YES), the program then advances to Step U6, and either the cooling or the heating of the lithium ion secondary battery 100 (the assembled battery 10) is stopped.

More specifically, when the lithium ion secondary battery 100 is being cooled, the microcomputer 330 sends an electric signal to place the switch 41 in the off state. This shuts off the supply of electric power from the assembled battery 10 to the cooling device 50, to thereby stop the cooling device 50 from cooling the lithium ion secondary battery 100.

On the contrary, when the lithium ion secondary battery 100 is being heated, the microcomputer 330 sends an electric signal to place the switch 42 in the off state. This shuts off the supply of electric power from the assembled battery 10 to the heating device 60, to thereby stop the heating device 60 from heating the lithium ion secondary battery 100.

Subsequently, the program advances to Step U7 where the microcomputer 30 determines whether or not a first predetermined length of time (for example, 4 hours) elapses since when the temperature T of the lithium ion secondary battery 100 was initially determined to be 45° C. And, if it is determined that the first predetermined length of time has not yet elapsed (NO), the program then returns again to Step U1, and the above-described process operation is carried out.

On the other hand, if it is determined that the first predetermined length of time has elapsed (YES), the program then advances to Step U8 where the microcomputer 330 detects, based on the output signal from the thermistor 40, the temperature T of the lithium ion secondary battery 100. Thereafter, the process operations of Steps U9-UE are carried out in the same way as Steps S2-S7 of Example 1. In Example 2, however, the microcomputer 330 determines whether or not a second predetermined length of time (for example, 4 hours) elapses since when the temperature T of the lithium ion secondary battery 100 was initially determined to be 60° C. And, if it determined that the second predetermined length of time has not yet elapsed (NO), the program then returns again to Step U8, and the above-described process operation is carried out. On the other hand, if Step UE determines that the second predetermined length of time has elapsed (YES), the series of process operations is then brought to a stop.

In the way as described above, in Example 2, it becomes possible that after the battery temperature T of the lithium ion secondary battery 100 is maintained within the range of not lower than 35° C. nor higher than 55° C. (particularly, maintained at 45° C.) for the first predetermined length of time (for example, for 4 hours), the battery temperature T of the lithium ion secondary battery 100 is maintained within the range: 55° C.<T<65° C. (particularly, maintained at 60° C.) for the second predetermined length of time (for example, for 4 hours). This enables enhancement of the safety of the lithium ion secondary battery 100 to thereby consequently enhance the safety of the automobile 21 while accomplishing effective recovery of the battery capacity of the lithium ion secondary battery 100 that has been decreased due to the deposition of lithium.

In Example 2, the process operations of Steps U1-U7 correspond to the first temperature control. Additionally, the process operations of Steps U8-UE correspond to the second temperature control.

It is preferable that the process operations of Steps U1-UE as described above (the first temperature control and the second temperature control) are carried out at predetermined intervals (for example, at intervals of every several days). Additionally, it may be arranged as follows. The deposition amount of lithium on the negative electrode plate 156 of the lithium ion secondary battery 100 is estimated. And, if the estimated amount reaches a specified value, the process operations of Steps U1-UE as described above (the temperature control of the lithium ion secondary battery 100) are then carried out.

Example 3

Figure 10:
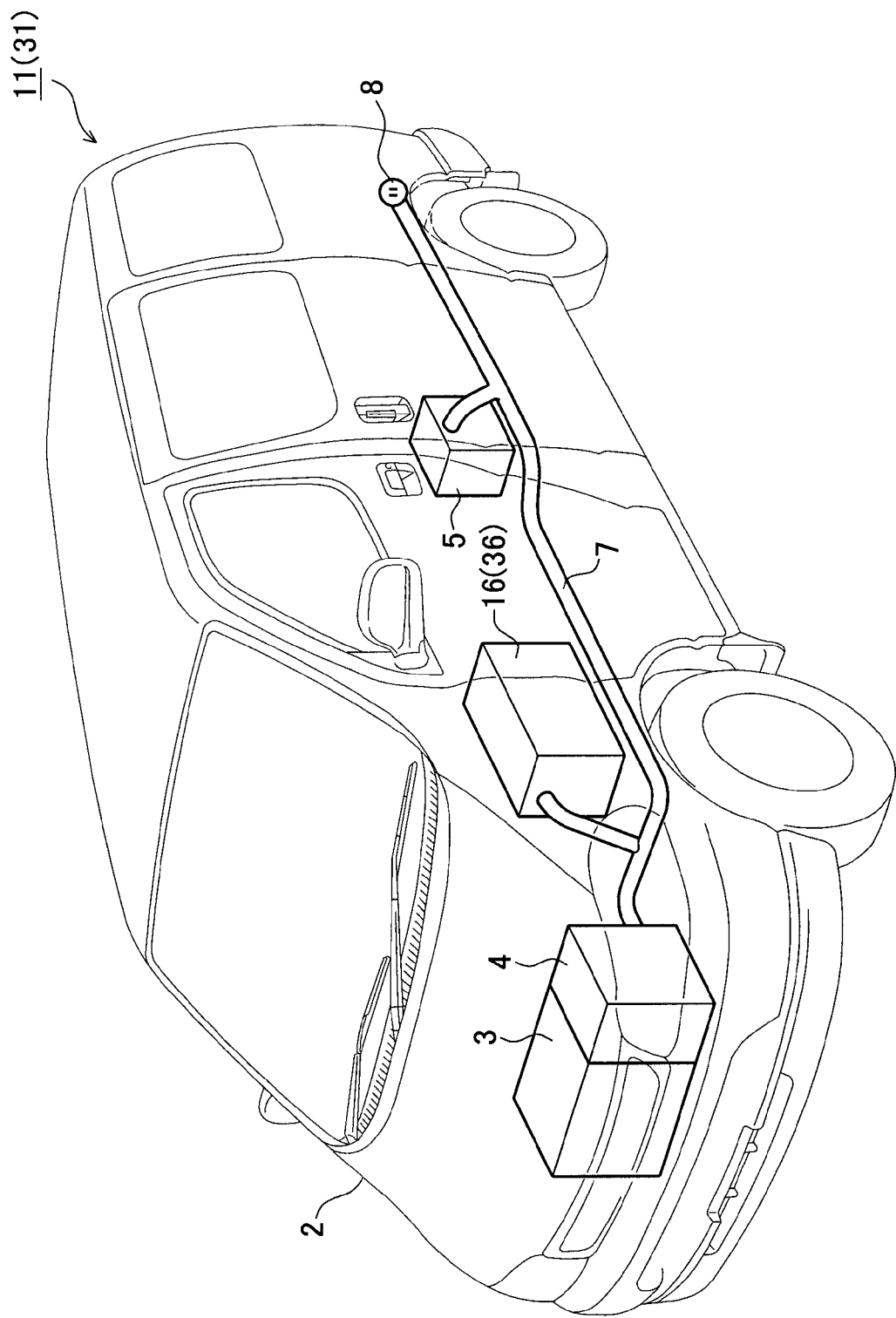
FIG. 10 is a schematic view of an automobile in Examples 3 and 4.
Figure 11:
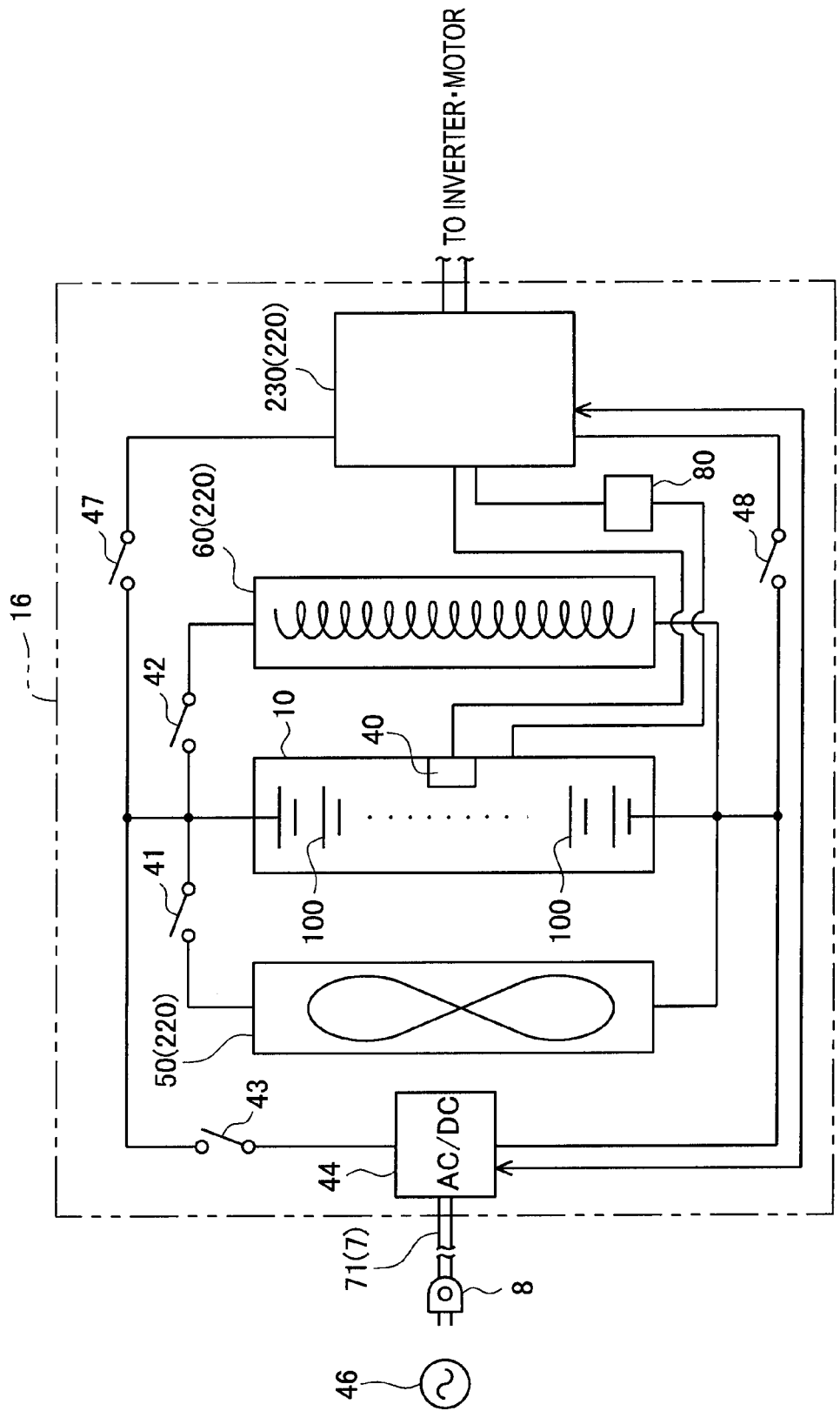
FIG. 11 is a schematic view of a battery system in Example 3.

Hereinafter, a description will be given regarding Example 3 of the present invention, referring to the drawings. FIG. 10 shows a hybrid electric automobile 11 of Example 3. The hybrid electric automobile 11 differs from the hybrid electric automobile 1 of Example 1 in a battery system. There is further provided a power supply plug 8 connected to the battery system. As shown in FIG. 11, a battery system 16 of Example 3 is provided with an assembled battery 10, a temperature control device 220, a conversion device 44 and a voltage detection device 80.

Of these components, the temperature control device 220 has a microcomputer 230, a cooling device 50 and a heating device 60. And, the voltage detection device 80 detects the voltage of battery (interterminal voltage) of each of the lithium ion secondary batteries 100 constituting the assembled battery 10.

The conversion device 44, formed by an AC/DC converter, is capable of conversion of the voltage of a commercial power supply 46 (external power supply) into a dc constant voltage having a constant voltage value. The conversion device 44 is electrically connected through a cable 71 contained in the cable 7 to the power supply plug 8. In addition, the conversion device 44 is electrically connected through a switch 43 to the assembled battery 10. The conversion device 44 is further electrically connected through the switch 41 to the cooling device 50, and is electrically connected through the switch 42 to the heating device 60.

The power supply plug 8 is configured so as to electrically be connectable to the commercial power supply 46. The power supply plug 8 is electrically connected to the conversion device 44. Therefore, the conversion device 44 and the commercial power supply 46 can electrically be connected together through the power supply plug 8. In Example 3, the cable 71 can be withdrawn to outside of the hybrid electric automobile 11 together with the power supply plug 8, thereby enabling the power supply plug 8 to be connected to the commercial power supply 46 at a distance from the hybrid electric automobile 11.

Therefore, in the hybrid electric automobile 11 of Example 3, the power supply plug 8 can be electrically connected to the commercial power supply 46 when the hybrid electric automobile 11 is being parked, whereby the lithium ion secondary battery 100 constituting the assembled battery 10 is charged using electric power supplied from the commercial power supply 46 (hereinafter, such charging is also referred to as the "plug-in charge").

The microcomputer 230 monitors the conversion device 44. Upon detection that electric power is being supplied from the commercial power supply 46 to the conversion device 44 via the power supply plug 8, the microcomputer 230 turns off the switches 47 and 48 and turns on the switch 43. This can charge the lithium ion secondary battery 100 constituting the assembled battery 10 with electric power supplied from the commercial power supply 46. More specifically, while the voltage of the commercial power supply 46 is being converted by the conversion device 44 into a dc constant voltage having a predetermined constant voltage value, the supply of electric power from the commercial power supply 46 is provided to the lithium ion secondary battery 100 constituting the assembled battery 10 via the conversion device 44.

During the period in which the lithium ion secondary battery 100 is charged using the commercial power supply 46, the microcomputer 230 estimates, based on the battery voltage detected by the voltage detection device 80, the SOC of the lithium ion secondary battery 100 constituting the assembled battery 10. And, if it is determined that the SOC has reached 100%, charging of the assembled battery 10 is stopped. More specifically, the switch 43 is turned off and the switches 47 and 48 are turned on.

During the plug-in charging, the microcomputer 230 judges whether or not the battery temperature of the lithium ion secondary battery 100 detected through the thermistor 40 is 60° C. And, if the microcomputer 230 judges that the battery temperature of the lithium ion secondary battery 100 is not 60° C., the microcomputer 230 then performs control to either heat or cool the lithium ion secondary battery 100 for the temperature of the lithium ion secondary battery 100 to reach 60° C.

Figure 12:
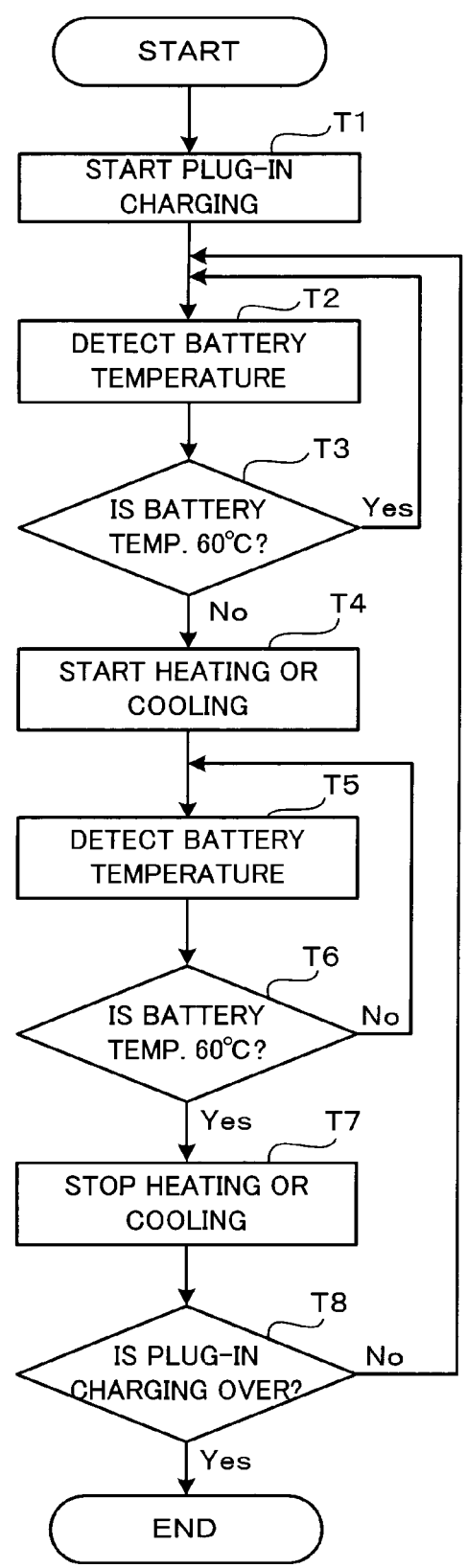
FIG. 12 is a flowchart representative of a temperature control flow of the lithium ion secondary battery in Example 3.

Next, referring to FIG. 12, a description will be given regarding the temperature control of the lithium ion secondary battery 100 in the automobile 11 of Example 3. In Step T1, plug-in charging is started by the microcomputer 230. More specifically, it is determined whether or not the power supply plug 8 is electrically connected to the commercial power supply 46. The microcomputer 230 monitors the conversion device 44. Upon detection that electric power is being supplied from the commercial power supply 46 to the conversion device 44 via the power supply plug 8, the microcomputer 230 determines that the power supply plug 8 is being electrically connected to the commercial power supply 46. Once such a determination is made, the microcomputer 230 turns off the switches 47 and 48 and turns on the switch 43. This makes it possible that electric power is supplied from the commercial power supply 46 to the assembled battery 10 via the conversion device 44, to thereby start charging of the lithium ion secondary battery 100 constituting the assembled battery 10.

Subsequently, the program advances to Step T2 where the microcomputer 230 detects, based on the output signal from the thermistor 40, the temperature of the lithium ion secondary battery 100. Thereafter, the program advances to Step T3 where it is determined whether or not the detected battery temperature of the lithium ion secondary battery 100 is 60° C. And, if Step T3 determines that the battery temperature of the lithium ion secondary battery 100 is 60° C. (YES), the program then returns again to Step T2, and the above-described process operation is carried out. On the other hand, if Step T3 determines that the battery temperature of the lithium ion secondary battery 100 is not 60° C. (NO), the program then advances to Step T4, and either the cooling or the heating of the lithium ion secondary battery 100 constituting the assembled battery 10 is started.

More specifically, if the microcomputer 230 determines that the battery temperature of the lithium ion secondary battery 100 is higher than 60° C., the microcomputer 230 then performs control to cool the lithium ion secondary battery 100 by the cooling device 50. Particularly, the microcomputer 230 sends electric signals to turn on the switch 41 and turn off the switch 42. This provides the supply of electric power from the commercial power supply 46 to the cooling device 50 via the conversion device 44, to thereby place the cooling device 50 in operation to cool the lithium ion secondary battery 100 constituting the assembled battery 10.

On the contrary, if the microcomputer 230 determines that the battery temperature of the lithium ion secondary battery 100 is lower than 60° C., the microcomputer 230 then performs control to heat the lithium ion secondary battery 100 by the heating device 60. Particularly, the microcomputer 230 sends electric signals to turn on the switch 42 and turn off the switch 41. This provides the supply of electric power from the commercial power supply 46 to the heating device 60 via the conversion device 44 to thereby place the heating device 60 in operation to heat the lithium ion secondary battery 100 constituting the assembled battery 10.

Next, the program advances to Step T5 where the temperature of the lithium ion secondary battery 100 is detected. Thereafter, the program advances to Step T6 where it is determined whether or not the detected battery temperature of the lithium ion secondary battery 100 reaches 60° C. And, if Step S6 determines that the battery temperature of the lithium ion secondary battery 100 has not yet reached 60° C. (NO), the program then returns again to Step T5 where the temperature of the lithium ion secondary battery 100 is detected. Thereafter, if Step S6 determines that the battery temperature of the lithium ion secondary battery 100 has reached 60° C. (YES), the program then advances to Step T7, and either the cooling or the heating of the lithium ion secondary battery 100 (the assembled battery 10) is brought to a stop.

More specifically, when the lithium ion secondary battery 100 is being cooled, the microcomputer 230 sends an electric signal to place the switch 41 in the off state. This shuts off the supply of electric power from the commercial power supply 46 to the cooling device 50 via the conversion device 44, to thereby stop the cooling device 50 from cooling the lithium ion secondary battery 100. At that time, any electric power is not supplied from the assembled battery 10 to the cooling device 50, either (see FIG. 11).

On the contrary, when the lithium ion secondary battery 100 is being heated, the microcomputer 230 sends an electric signal to place the switch 42 in the off state. This shuts off the supply of electric power from the commercial power supply 46 to the heating device 60 via the conversion device 44, to thereby stop the heating device 60 from heating the lithium ion secondary battery 100. At that time, any electric power is supplied from the assembled battery 10 to the heating device 60, either (see FIG. 11).

Next, the program advances to Step T8 where the microcomputer 230 determines whether or not the plug-in charging is over. More specifically, during the plug-in charging, the microcomputer 230 estimates, based on the battery voltage detected by the voltage detection device 80, the SOC of the lithium ion secondary battery 100. If it is determined that the SOC has reached 100%, this brings charging of the assembled battery 10 to a stop. More specifically, the switch 43 is turned off whereas the switches 47 and 48 are turned on. Accordingly, the microcomputer 230 determines that the plug-in charging is over when the switch 43 is turned off and the switches 47 and 48 are turned on.

If the microcomputer 230 determines that the plug-in charging is not over in Step T8 (NO), the program then returns again to Step T2 where the above-described process operation is carried out. On the other hand, if it is determined that the plug-in charging is over (YES), the series of process operations is then brought to a stop.

In the way as described above, in Example 3, the temperature T of the lithium ion secondary battery 100 can be maintained within the range: 55° C.<T<65° C. (particularly, at 60° C.), during the period in which the lithium ion secondary battery 100 is charged with electric power supplied from the external power supply (the commercial power supply 46), i.e., during the plug-in charging. It is therefore possible to efficiently deactivate or inactivate the metallic lithium deposited on the negative electrode plate 156 of the lithium ion secondary battery 100 while restraining the non-aqueous electrolyte 140 from decomposition, whereby the deposition amount of metallic lithium is reduced to a considerable extent. This enables enhancement of the safety of the lithium ion secondary battery 100 to thereby consequently enhance the safety of the automobile 11.

Further, it is preferable that the process operations of Steps T1-T8 (the temperature control of the lithium ion secondary battery 100) are carried out, for example, every time plug-in charging is performed. It may be arranged such that the deposition amount of lithium on the negative electrode plate 156 of the lithium ion secondary battery 100 is estimated, and plug-in charging is performed only when the estimated amount reaches a specific value.

Example 4

Figure 13:
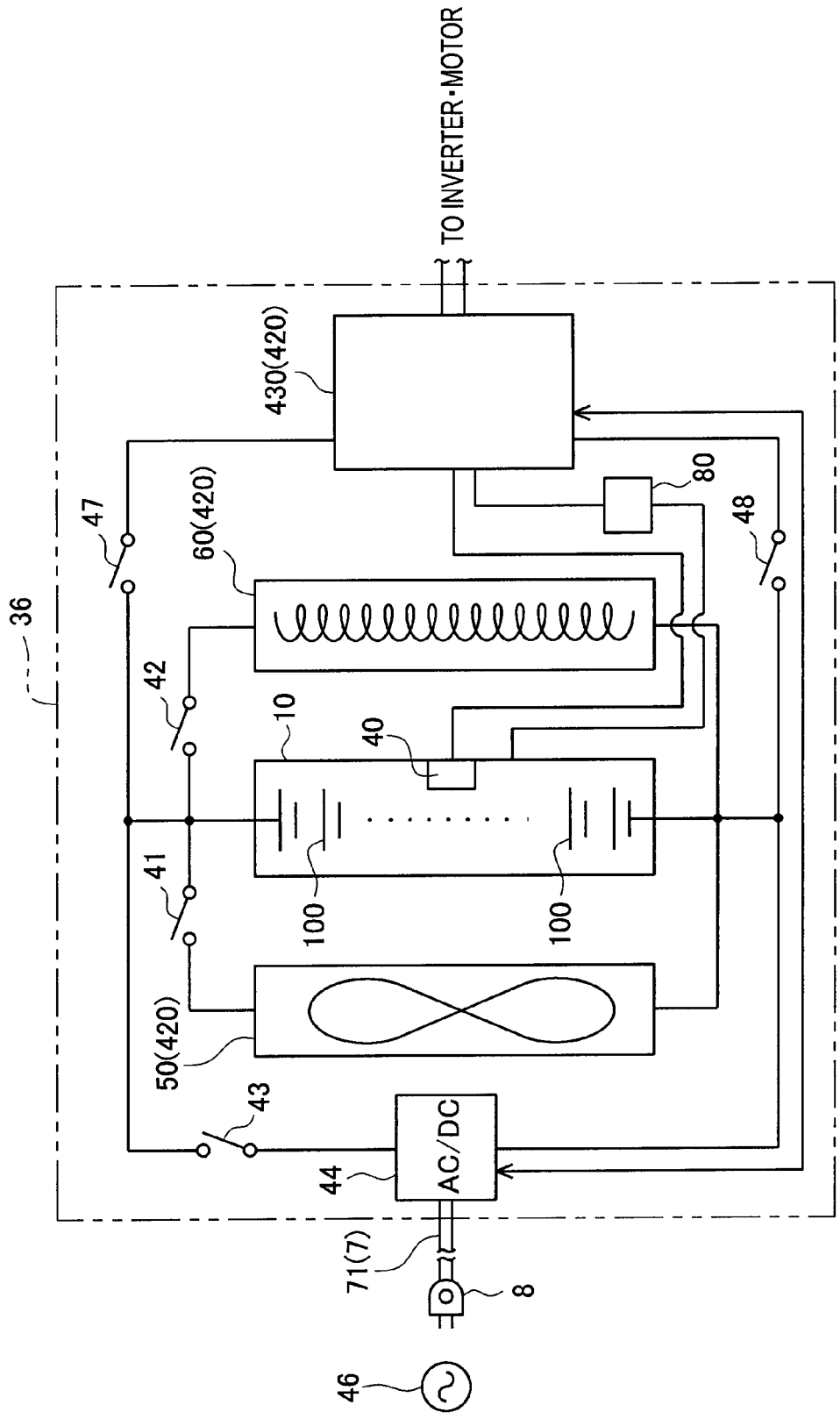
FIG. 13 is a schematic view of a battery system in Example 4.

Next, a description will be given regarding Example 4 of the present invention, referring to the drawings. FIG. 10 shows a hybrid electric automobile 31 of Example 4. The hybrid electric automobile 31 differs from the hybrid electric automobile 11 of Example 3 only in a battery system. As shown in FIG. 13, the battery system 36 of Example 4 is provided with an assembled battery 10, a conversion device 44 and a voltage detection device 80, all of which are of the same type as those of Example 3, and a temperature control device 420 different from that of Example 3. The temperature control device 420 has a cooling device 50 and a heating device 60, both of which are of the same type as those of Example 3, and a microcomputer 430 different from that of Example 3. The microcomputer 430 has a ROM, a CPU, a RAM etc. which are not shown in the figure.

The microcomputer 430 monitors the conversion device 44. And upon detection that electric power is being supplied from the commercial power supply 46 to the conversion device 44 via the power supply plug 8, the microcomputer 430 estimates, based on the battery voltage detected by the voltage detection device 80, the SOC of the lithium ion secondary battery 100 constituting the assembled battery 10. And, based on the current value preset for the plug-in charging and the present SOC value, there is estimated a plug-in period, i.e., a length of charging time taken for the SOC of the lithium ion secondary battery 100 to reach 100% by plug-in charging. Thereafter, the switches 47 and 48 are turned off whereas the switch 43 is turned on. This makes it possible to charge the lithium ion secondary battery 100 constituting the assembled battery 10 with electric power supplied from the commercial power supply 46.

Further, during the period in which the lithium ion secondary battery 100 is charged using the commercial power supply 46, the microcomputer 430 estimates, based on the battery voltage detected by the voltage detection device 80, the SOC of the lithium ion secondary battery 100 constituting the assembled battery 10. This makes it possible to calculate to what degree the plug-in charging has advanced, whereby it can be determined whether or not a first half of the plug-in charging is over. More specifically, if the SOC of the lithium ion secondary battery 100 when the plug-in charging starts is 20%, it can be determined that the first half of the plug-in charging is over when the estimated SOC reaches 60%. Thereafter, if it is determined that the SOC reaches 100%, charging of the assembled battery 10 is stopped. More specifically, the switch 43 is turned off whereas the switches 47 and 48 are turned on.

Furthermore, the microcomputer 430 first judges whether or not the battery temperature T of the lithium ion secondary battery 100 detected through the thermistor 40 is 45° C., during the period of the first half of the plug-in charging. Further, if the microcomputer 430 judges that the battery temperature T of the lithium ion secondary battery 100 is not 45° C., the microcomputer 430 then performs control to either heat or cool the lithium ion secondary battery 100 for the temperature T of the lithium ion secondary battery 100 to reach 45° C. The specific control method is the same as Example 2 described above.

In the way as described above, in Example 4, the battery temperature of the lithium ion secondary battery 100 is maintained within the range of not lower than 35° C. nor higher than 55° C. (particularly, maintained at 45° C.) by the temperature control device 420, during the period of the first half of the plug-in charging. It is therefore possible for the metallic lithium deposited on the negative electrode plate 156 of the lithium ion secondary battery 100 to efficiently return to lithium ions. Thus, this can accomplish effective recovery of the battery capacity that has been decreased due to the deposition of lithium.

Thereafter, the microcomputer 430 of Example 4 determines whether or not the battery temperature T of the lithium ion secondary battery 100 detected through the thermistor 40 is 60° C. And, if the microcomputer 430 determines that the battery temperature T of the lithium ion secondary battery 100 is not 60° C., the microcomputer 430 then performs control to either heat or cool the lithium ion secondary battery 100 for the temperature T of the lithium ion secondary battery 100 to reach 60° C. The specific control method is the same as Examples 1-3 described above.

In the way as described above, according to Example 4, it becomes possible that after the battery temperature of the lithium ion secondary battery 100 is maintained within the range of not lower than 35° C. nor higher than 55° C. (particularly, at 45° C.) during the period of the first half of the plug-in charging, the battery temperature T of the lithium ion secondary battery 100 is then maintained within the range 55° C.<T<65° C. (particularly, maintained at 60° C.) during the period of the second half of the plug-in charging. This makes it possible to efficiently deactivate or inactivate the metallic lithium that has been failed to return to lithium ions during the period of the first half of the plug-in charging.

Therefore, according to the battery system 36 of Example 4, while the non-aqueous electrolyte 140 is restrained from decomposition, the battery capacity of the lithium ion secondary battery 100 that has been decreased due to the deposition of lithium is effectively recovered and, in addition, the safety of the lithium ion secondary battery 100 is enhanced.

Figure 14:
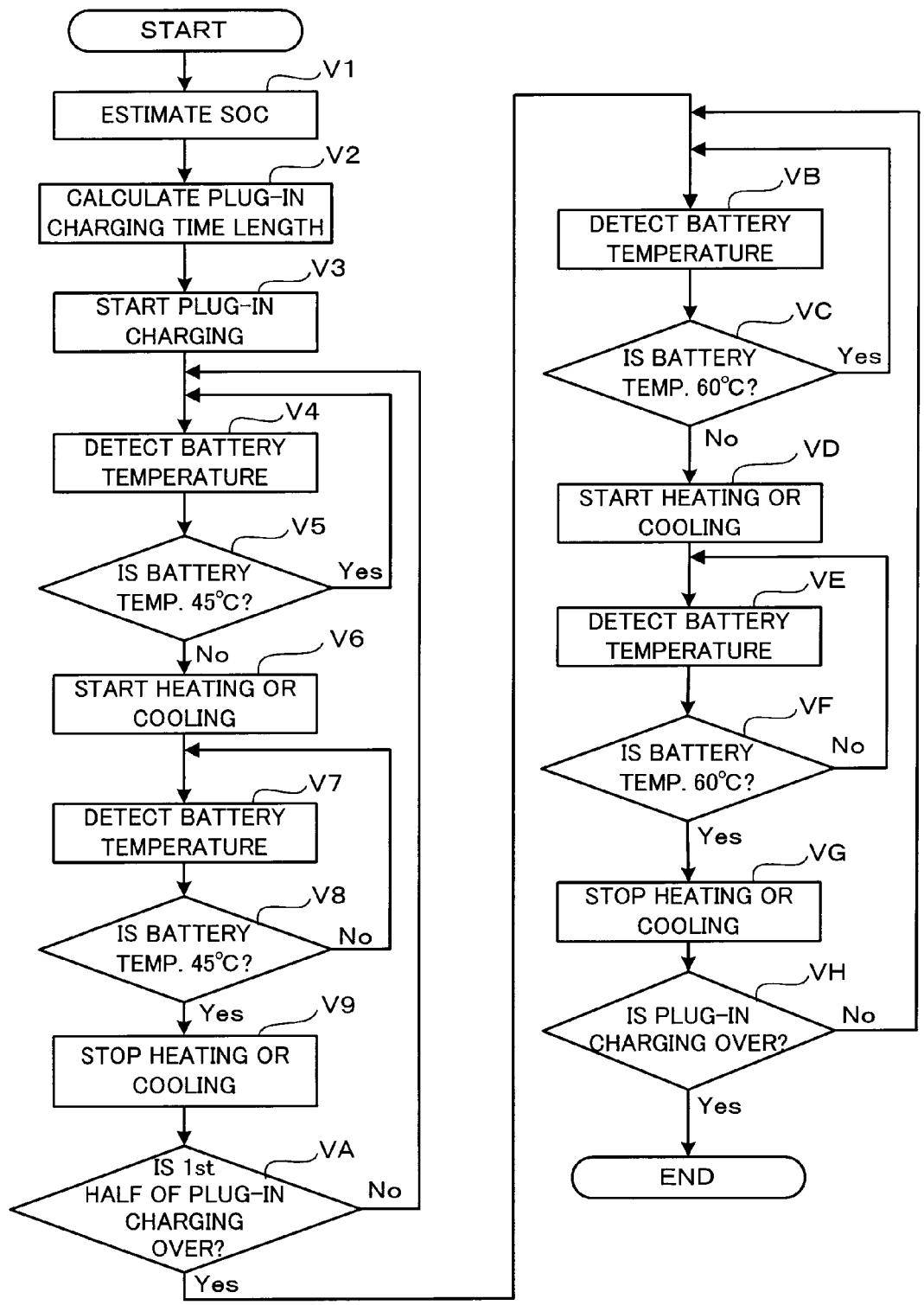
FIG. 14 is a flowchart representative of a temperature control flow of the lithium ion secondary battery in Example 4.

Next, referring to FIG. 14, a description will be given regarding the temperature control of the lithium ion secondary battery 100 in the automobile 31 of Example 4. In Step V1, firstly, the microcomputer 430 estimates, based on the battery voltage detected by the voltage detection device 80, the SOC of the lithium ion secondary battery 100 constituting the assembled battery 10. Subsequently, the program advances to Step V2, and based on the current value preset for the plug-in charging and the present SOC value, there is calculated a plug-in period (i.e., a length of charging time taken for the SOC of the lithium ion secondary battery 100 to reach 100% by plug-in charging).

Thereafter, the program advances to Step V3 where plug-in charging is started. More specifically, the switches 47 and 48 are turned off whereas the switch 43 is turned on. It is therefore possible to charge the lithium ion secondary battery 100 constituting the assembled battery 10 with electric power supplied from the commercial power supply 46.

Subsequently, the program advances to Step V4 where the microcomputer 430 detects, based on the output signal from the thermistor 40, the temperature T of the lithium ion secondary battery 100. Thereafter, the microcomputer 430 carries out the process operations of Steps V5-V9 in the same way that the process operations of Steps U2-U6 of Example 2 are carried out.

Next, the program advances to Step VA where the microcomputer 430 determines whether or not the first half of the plug-in charging period is over. More specifically, if the SOC of the lithium ion secondary battery 100 when the plug-in charging start is 20%, this makes it possible to determine that the first half of the plug-in charging period is over at the time when the estimated SOC reaches 60%. The microcomputer 430 also estimates or calculates, based on the battery voltage detected by the voltage detection device 80, the SOC of the lithium ion secondary battery 100 constituting the assembled battery 10.

If Step VA determines that the first half of the plug-in charging period is not over (NO), the program then returns again to Step V4, and the above-described process operation is repeated. On the other hand, if Step VA determines that the first half of the plug-in charging period is now over (YES), the program then advances to Step VB where the microcomputer 430 detects, based on the output signal from the thermistor 40, the temperature T of the lithium ion secondary battery 100. Thereafter, the microcomputer 430 carries out the process operations of Steps VC-VH in the same way that the process operations of Steps T3-T8 of Example 3 are carried out.

In the way as described above, according to Example 4, it becomes possible that after the battery temperature of the lithium ion secondary battery 100 is maintained in the range of not lower than 35° C. nor higher than 55° C. (particularly, at 45° C.) during the first half of the plug-in charging period, the battery temperature T of the lithium ion secondary battery 100 is then maintained within the range: 55° C.<T<65° C. (particularly, at 60° C.) during the second half of the plug-in charging period. This enables enhancement of the safety of the lithium ion secondary battery 100 to thereby consequently enhance the safety of the automobile 31 while accomplishing effective recovery of the battery capacity that has been decreased due to the deposition of lithium.

In Example 4, the process operations of Steps V4-VA correspond to the first temperature control. Additionally, the process operations of Steps VB-VH correspond to the second temperature control.

Further, it is preferable that the process operations of Steps V1-VH (the first temperature control and the second temperature control) are carried out, for example, every time plug-in charging is carried out. It may also be arranged such that the deposition amount of lithium on the negative electrode plate 156 of the lithium ion secondary battery 100 is estimated and plug-in charging is performed only when the estimated amount reaches a specific value.

The present invention is described in the aforementioned Examples 1 to 4 but is not limited thereto. The present invention may be embodied in other specific forms without departing from the essential characteristics thereof.

The invention claimed is:

1. A battery system comprising:
    a lithium on secondary battery; and
    a temperature control device for controlling the temperature of the lithium on secondary battery,
    wherein the temperature control device performs control to maintain the temperature T of the lithium ion secondary battery within the range: 55° C.<T<65° C. for a predetermined length of time, wherein
    the lithium ion secondary battery is adapted to be mounted as an automobile drive power supply in an automobile,
    the battery system is configured to enable charging of the lithium ion secondary battery by use of electric power supplied from an external power supply during parking of the automobile, and
    the temperature control device performs control to maintain the temperature T of the lithium ion secondary battery within the range: 55° C.<T<65° by cooling or heating the lithium ion secondary battery throughout an entire period of time in which the lithium ion secondary battery is charged with electric power supplied from the external power supply from a start of charging the lithium ion secondary battery with electric power to an end of the charging of the lithium ion secondary battery with electric power.

2. The battery system according to claim 1, wherein
    the temperature control device performs control to maintain the temperature of the lithium ion secondary battery at 60° C. for a predetermined length of time.

3. The battery system according to claim 1, wherein
    before performing second temperature control to maintain the temperature T of the lithium ion secondary battery within the range: 55° C.<T<65° C., the temperature control device performs first temperature control to maintain the temperature T of the lithium ion secondary battery within the range: 35° C.≤T≤55° C.

4. The battery system according to claim 3, wherein
    the temperature control device performs the first temperature control to maintain the temperature T of the lithium ion secondary battery at 45° C., and performs the second temperature control to maintain the temperature T of the lithium ion secondary battery at 60° C.

5. An automobile equipped with the battery system according to claim 1.

* * * * *